US010461913B2

(12) United States Patent
Xu et al.

(10) Patent No.: US 10,461,913 B2
(45) Date of Patent: Oct. 29, 2019

(54) INDICATION INFORMATION TRANSMISSION METHOD AND APPARATUS

(71) Applicant: Huawei Technologies Co., Ltd., Shenzhen (CN)

(72) Inventors: Xiuqiang Xu, Shanghai (CN); Yiqun Wu, Shanghai (CN); Yan Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 15/628,939

(22) Filed: Jun. 21, 2017

(65) Prior Publication Data

US 2017/0286410 A1    Oct. 5, 2017

Related U.S. Application Data

(63) Continuation of application No. PCT/CN2014/094541, filed on Dec. 22, 2014.

(51) Int. Cl.
*H04L 5/02*  (2006.01)
*H04L 5/00*  (2006.01)
(Continued)

(52) U.S. Cl.
CPC .......... *H04L 5/026* (2013.01); *H04L 5/0005* (2013.01); *H04L 5/0021* (2013.01);
(Continued)

(58) Field of Classification Search
CPC ..... H04L 5/026; H04L 5/0091; H04L 5/0042; H04L 5/0044; H04L 5/0005; H04L 5/0021; H04W 72/1289; H04W 72/042
See application file for complete search history.

(56) References Cited

U.S. PATENT DOCUMENTS 9,880,256 B2 *  1/2018  Baxley ................. G06F 16/285
2007/0054624 A1  3/2007  Kashiwagi
(Continued)

FOREIGN PATENT DOCUMENTS

CA      2894349 C  *  3/2017  ........... H04L 1/0029
CN    101541011 A       9/2009
(Continued)

OTHER PUBLICATIONS

Hoshyar, R. et al., "LDS-OFDM an Efficient Multiple Access Technique," 2010 IEEE 71st Vehicular Technology Conference (VTC 2010-Spring), 2010, 6 pages.
(Continued)

*Primary Examiner* — Uzma Alam
(74) *Attorney, Agent, or Firm* — Slater Matsil, LLP

(57) ABSTRACT

The present invention discloses an indication information transmission method and apparatus. The method includes determining a first signature sequence and a first modulation constellation that are used to transmit a first downlink data stream to a terminal device and determining one or more second signature sequences and one or more second modulation constellations that are used to transmit a second downlink data stream. The method also includes determining indication information that is used to indicate the first signature sequence, the first modulation constellation, the one or more second signature sequences, and the one or more second modulation constellations and transmitting the indication information to the terminal device.

20 Claims, 8 Drawing Sheets

(51) Int. Cl.
*H04W 72/04* (2009.01)
*H04W 72/12* (2009.01)

(52) U.S. Cl.
CPC .......... *H04L 5/0042* (2013.01); *H04L 5/0044* (2013.01); *H04L 5/0091* (2013.01); *H04W 72/042* (2013.01); *H04W 72/1289* (2013.01)

(56) References Cited

U.S. PATENT DOCUMENTS

| | | | |
|---|---|---|---|
| 2009/0154473 A1* | 6/2009 | Diab | H04L 12/4013 370/400 |
| 2009/0154593 A1* | 6/2009 | Diab | H04L 47/10 375/295 |
| 2013/0301556 A1* | 11/2013 | Porat | H04L 1/0071 370/329 |
| 2014/0029562 A1* | 1/2014 | Kishiyama | H04W 72/082 370/329 |
| 2014/0140360 A1* | 5/2014 | Nikopour | H04J 13/00 370/479 |
| 2014/0169412 A1* | 6/2014 | Baligh | H04B 1/709 375/150 |
| 2014/0254455 A1 | 9/2014 | Nikopour et al. | |
| 2014/0369434 A1* | 12/2014 | Taherzadehboroujeni | H04B 7/0456 375/261 |
| 2016/0150544 A1 | 5/2016 | Nikopour et al. | |

FOREIGN PATENT DOCUMENTS

| | | |
|---|---|---|
| CN | 101621490 A | 1/2010 |
| CN | 101640940 A | 2/2010 |
| CN | 102232319 A | 11/2011 |
| CN | 103368717 A | 10/2013 |
| CN | 104158631 A | 11/2014 |
| EP | 2247138 B1 | 7/2014 |
| WO | 2007029745 A1 | 3/2007 |
| WO | 2010102435 A1 | 9/2010 |

OTHER PUBLICATIONS

Van De Beek, J. et al., "Multiple Access with Low-Density Signatures," IEEE Global Telecommunications Conference, GLOBECOMM 2009, XP055414026, Piscataway, NJ, USA, 6 pages.

Taherzadeh, M. et al., "SCMA Codebook Design," 2014 IEEE Vehicular Technology Conference (VTC2014-Fall), Sep. 14, 2014, 6 pages.

* cited by examiner

230

```
┌─────────────────────────────────────────────────────────┐
│ Determine that a first signature sequence and one or more second │
│ signature sequences belong to a first signature matrix, where each │ ⌒ S231
│     signature matrix includes two or more signature sequences    │
└─────────────────────────────────────────────────────────┘
                              │
┌─────────────────────────────────────────────────────────┐
│     Determine that indication information includes first signature │
│ matrix information, first signature sequence information, and first │
│         indication information, where the first signature matrix    │
│      information is used to indicate a first signature matrix, the first │
│         signature sequence information is used to indicate the first │
│ signature sequence in the first signature matrix, the first indication │ ⌒ S232
│        information is used to indicate a first modulation constellation │
│           corresponding to the first signature sequence, and the first │
│           indication information is further used to indicate one or more │
│   second signature sequences in the first signature matrix and one or │
│      more second modulation constellations corresponding to the one │
│                 or more second signature sequences                    │
└─────────────────────────────────────────────────────────┘
```

```
S310: Receive indication information transmitted by a network device,
where the indication information is used to indicate a first signature
sequence and a first modulation constellation that are used to transmit
a first downlink data stream by the network device, and one or more
second signature sequences and one or more second modulation
constellations that are used to transmit a second downlink data stream
by the network device, where the second downlink data stream is one
or more downlink data streams, other than the first downlink data
stream, that are carried on a time-frequency resource used by the first
downlink data stream, each signature sequence is a multi-dimensional
complex-number vector including at least one zero element and at
least one non-zero element, and the signature sequence is used to
perform amplitude and phase adjustment on a modulation symbol
obtained after the network device performs constellation mapping on
a downlink data stream by using a modulation constellation
```

S320: Determine the first signature sequence, the first modulation constellation, the one or more second signature sequences, and the one or more second modulation constellations according to the indication information S330: Decode, according to the first signature sequence, the first modulation constellation, the one or more second signature sequences, and the one or more second modulation constellations, the first downlink data stream transmitted by the network device

FIG. 5

INDICATION INFORMATION TRANSMISSION METHOD AND APPARATUS

CROSS-REFERENCE TO RELATED APPLICATIONS

This application is a continuation of International Patent Application No. PCT/CN2014/094541, filed on Dec. 22, 2014, the disclosure of which is hereby incorporated by reference in its entirety.

TECHNICAL FIELD

The present invention relates to the communications field, and in particular, to an indication information transmission method and apparatus in the communications field.

BACKGROUND

With constant evolution of a wireless cellular network, orthogonal multiple access technologies widely applied to the third-generation (3G) and the fourth-generation (4G) mobile communications systems, such as a Code Division Multiple Access (CDMA) technology and an orthogonal frequency division multiple access (OFDMA) technology, are gradually unable to meet people's ever-increasing capacity requirement for the cellular network, such as massive access and constant improvement of spectral efficiency. In addition, the study and application of a non-orthogonal multiple access technology has been gradually attracting more attentions from the industry and academia. People expect that a future wireless cellular network, for example, the fifth-generation (5G) mobile communications system, can effectively increase a capacity by using the non-orthogonal multiple access technology.

A low-density signature (LDS) technology is a typical non-orthogonal multiple access and transmission technology. Certainly, the LDS technology may have another name in the communications field. This technology is used to superpose M (where M is an integer not less than 1) data streams from one or more users onto N (where N is an integer not less than 1) subcarriers for transmission, where data of each data stream is spread on the N subcarriers by means of sparse spread spectrum. When a value of M is greater than that of N, this technology can effectively increase a network capacity, including a quantity of accessible users of a system and spectral efficiency. Therefore, as an important non-orthogonal multiple access technology, the LDS technology has drawn more attentions, and become an important candidate access technology for future wireless cellular network evolution.

In a non-orthogonal multiple access system such as an LDS system, when a terminal device receives a downlink data stream that is transmitted by a network device by using the non-orthogonal multiple access technology, the terminal device needs to know data transmission information such as a modulation constellation that is used to transmit the downlink data stream. However, selection and allocation of the data transmission information is usually completed by the network device, and the terminal device does not directly participate in this process. Therefore, after the network device allocates data transmission information such as a modulation constellation for a to-be-received data stream of the terminal device, how to notify the allocated data transmission information to the terminal device is a technical problem to be urgently resolved.

SUMMARY

In view of this, embodiments of the present invention provide an indication information transmission method and apparatus, to resolve a problem that a network device indicates data transmission information to a terminal device in a non-orthogonal multiple access system.

According to a first aspect, an indication information transmission method is provided, where the method includes determining a first signature sequence and a first modulation constellation that are used to transmit a first downlink data stream to a terminal device, where each signature sequence is a multi-dimensional complex-number vector including at least one zero element and at least one non-zero element, and the signature sequence is used to perform amplitude and phase adjustment on a modulation symbol obtained after a network device performs constellation mapping on a downlink data stream by using a modulation constellation. The method also includes determining one or more second signature sequences and one or more second modulation constellations that are used to transmit a second downlink data stream, where the second downlink data stream is one or more downlink data streams, other than the first downlink data stream, that are carried on a time-frequency resource used by the first downlink data stream. Additionally, the method includes determining indication information that is used to indicate the first signature sequence, the first modulation constellation, the one or more second signature sequences, and the one or more second modulation constellations and transmitting the indication information to the terminal device.

With reference to the first aspect, in a first possible implementation of the first aspect, the determining indication information that is used to indicate the first signature sequence, the first modulation constellation, the one or more second signature sequences, and the one or more second modulation constellations includes: determining that the first signature sequence and the one or more second signature sequences belong to a first signature matrix, where each signature matrix includes two or more signature sequences; and determining that the indication information includes first signature matrix information, first signature sequence information, and first indication information, where the first signature matrix information is used to indicate the first signature matrix, the first signature sequence information is used to indicate the first signature sequence in the first signature matrix, the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences.

With reference to the first possible implementation of the first aspect, in a second possible implementation of the first aspect, the first indication information includes: first modulation constellation information, second signature sequence information, and second modulation constellation information, where the first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

With reference to the first possible implementation of the first aspect, in a third possible implementation of the first aspect, the first indication information includes M groups of bit string information corresponding to signature sequences in the first signature matrix in a one-to-one manner; each group of bit string information is used to indicate whether a corresponding signature sequence is the first signature sequence or the one or more second signature sequences; and when a signature sequence corresponding to the group of bit string information is the first signature sequence or the one or more second signature sequences, the group of bit string information is further used to indicate the first modulation constellation or the one or more second modulation constellations corresponding to the corresponding signature sequence, where M is a quantity of signature sequences included in the first signature matrix.

With reference to the second or the third possible implementation of the first aspect, in a fourth possible implementation of the first aspect, the first indication information includes modulation order information of the first modulation constellation and modulation order information of the one or more second modulation constellations.

With reference to any one of the first aspect or the first to the fourth possible implementations of the first aspect, in a fifth possible implementation of the first aspect, the transmitting the indication information to the terminal device includes: transmitting, to the terminal device, a downlink scheduling message, dedicated higher-layer control signaling, or a system broadcast message, where the downlink scheduling message, the dedicated higher-layer control signaling, and the system broadcast message include the indication information.

With reference to the fifth possible implementation of the first aspect, in a sixth possible implementation of the first aspect, the dedicated higher-layer control signaling includes a radio resource control (RRC) connection setup message and an RRC connection reconfiguration message.

With reference to any one of the first aspect or the first to the sixth possible implementations of the first aspect, in a seventh possible implementation of the first aspect, the indication information is bit string information.

With reference to any one of the first aspect or the first to the seventh possible implementations of the first aspect, in an eighth possible implementation of the first aspect, the signature sequence is a low-density signature (LDS) sequence.

With reference to the eighth possible implementation of the first aspect, in a ninth possible implementation of the first aspect, a quantity of zero elements included in the signature sequence is greater than or equal to a quantity of non-zero elements.

According to a second aspect, an indication information transmission method is provided, where the method includes receiving indication information transmitted by a network device, where the indication information is used to indicate a first signature sequence and a first modulation constellation that are used to transmit a first downlink data stream by the network device, and one or more second signature sequences and one or more second modulation constellations that are used to transmit a second downlink data stream by the network device, where the second downlink data stream is one or more downlink data streams, other than the first downlink data stream, that are carried on a time-frequency resource used by the first downlink data stream, each signature sequence is a multi-dimensional complex-number vector including at least one zero element and at least one non-zero element, and the signature sequence is used to perform amplitude and phase adjustment on a modulation symbol obtained after the network device performs constellation mapping on a downlink data stream by using a modulation constellation. The method also includes determining the first signature sequence, the first modulation constellation, the one or more second signature sequences, and the one or more second modulation constellations according to the indication information; and decoding, according to the first signature sequence, the first modulation constellation, the one or more second signature sequences, and the one or more second modulation constellations, the first downlink data stream transmitted by the network device.

With reference to the second aspect, in a first possible implementation of the second aspect, the indication information includes first signature matrix information, first signature sequence information, and first indication information, where the first signature matrix information is used to indicate a first signature matrix, the first signature sequence information is used to indicate the first signature sequence in the first signature matrix, the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences; and the determining the first signature sequence, the first modulation constellation, the one or more second signature sequences, and the one or more second modulation constellations according to the indication information includes: determining, according to the first signature matrix information, the first signature sequence information, and the first indication information, the first signature sequence in the first signature matrix, the first modulation constellation, the one or more second signature sequences in the first signature matrix and the one or more second modulation constellations corresponding to the one or more second signature sequences, where each signature matrix includes two or more signature sequences.

With reference to the first possible implementation of the second aspect, in a second possible implementation of the second aspect, the first indication information includes: first modulation constellation information, second signature sequence information, and second modulation constellation information, where the first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

With reference to the first possible implementation of the second aspect, in a third possible implementation of the second aspect, the first indication information includes M groups of bit string information corresponding to signature sequences in the first signature matrix in a one-to-one manner; each group of bit string information is used to indicate whether a corresponding signature sequence is the first signature sequence or the one or more second signature sequences; and when a signature sequence corresponding to the group of bit string information is the first signature sequence or the one or more second signature sequences, the group of bit string information is further used to indicate the first modulation constellation or the one or more second modulation constellations corresponding to the corresponding signature sequence, where M is a quantity of signature sequences included in the first signature matrix.

With reference to the second or the third possible implementation of the second aspect, in a fourth possible implementation of the second aspect, the first indication information includes modulation order information of the first modulation constellation and modulation order information of the one or more second modulation constellations.

With reference to any one of the second aspect or the first to the fourth possible implementations of the second aspect, in a fifth possible implementation of the second aspect, the receiving indication information transmitted by a network device includes: receiving, from the network device, a downlink scheduling message, dedicated higher-layer control signaling, or a system broadcast message, where the downlink scheduling message, the dedicated higher-layer control signaling, and the system broadcast message include the indication information.

With reference to the fifth possible implementation of the second aspect, in a sixth possible implementation of the second aspect, the dedicated higher-layer control signaling includes a RRC connection setup message and an RRC connection reconfiguration message.

With reference to any one of the second aspect or the first to the sixth possible implementations of the second aspect, in a seventh possible implementation of the second aspect, the indication information is bit string information.

With reference to any one of the second aspect or the first to the seventh possible implementations of the second aspect, in an eighth possible implementation of the second aspect, the signature sequence is a LDS sequence.

With reference to the eighth possible implementation of the second aspect, in a ninth possible implementation of the second aspect, a quantity of zero elements included in the signature sequence is greater than or equal to a quantity of non-zero elements.

According to a third aspect, an indication information transmission apparatus is provided, where the apparatus includes: a first determining module, configured to determine a first signature sequence and a first modulation constellation that are used to transmit a first downlink data stream to a terminal device, where each signature sequence is a multi-dimensional complex-number vector including at least one zero element and at least one non-zero element, and the signature sequence is used to perform amplitude and phase adjustment on a modulation symbol obtained after a network device performs constellation mapping on a downlink data stream by using a modulation constellation; a second determining module, configured to determine one or more second signature sequences and one or more second modulation constellations that are used to transmit a second downlink data stream, where the second downlink data stream is one or more downlink data streams, other than the first downlink data stream, that are carried on a time-frequency resource used by the first downlink data stream; a third determining module, configured to determine indication information indicating the first signature sequence and the first modulation constellation that are determined by the first determining module, and configured to determine indication information indicating the one or more second signature sequences and the one or more second modulation constellations that are determined by the second determining module; and a transmitting module, configured to transmit, to the terminal device, the indication information determined by the third determining module.

With reference to the third aspect, in a first possible implementation of the third aspect, the third determining module includes: a first determining unit, configured to determine that the first signature sequence and the one or more second signature sequences belong to a first signature matrix, where each signature matrix includes two or more signature sequences; and a second determining unit, configured to determine that the indication information includes first signature matrix information, first signature sequence information, and first indication information, where the first signature matrix information is used to indicate the first signature matrix, the first signature sequence information is used to indicate the first signature sequence in the first signature matrix, the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences.

With reference to the first possible implementation of the third aspect, in a second possible implementation of the third aspect, the first indication information determined by the second determining unit includes: first modulation constellation information, second signature sequence information, and second modulation constellation information, where the first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

With reference to the first possible implementation of the third aspect, in a third possible implementation of the third aspect, the first indication information determined by the second determining unit includes M groups of bit string information corresponding to signature sequences in the first signature matrix in a one-to-one manner; each group of bit string information is used to indicate whether a corresponding signature sequence is the first signature sequence or the one or more second signature sequences; and when a signature sequence corresponding to the group of bit string information is the first signature sequence or the one or more second signature sequences, the group of bit string information is further used to indicate the first modulation constellation or the one or more second modulation constellations corresponding to the corresponding signature sequence, where M is a quantity of signature sequences included in the first signature matrix.

With reference to the second or the third possible implementation of the third aspect, in a fourth possible implementation of the third aspect, the first indication information determined by the second determining unit includes modulation order information of the first modulation constellation and modulation order information of the one or more second modulation constellations.

With reference to any one of the third aspect or the first to the fourth possible implementations of the third aspect, in a fifth possible implementation of the third aspect, the transmitting module is specifically configured to transmit, to the terminal device, a downlink scheduling message, dedicated higher-layer control signaling, or a system broadcast message, where the downlink scheduling message, the dedicated higher-layer control signaling, and the system broadcast message include the indication information.

With reference to the fifth possible implementation of the third aspect, in a sixth possible implementation of the third aspect, the dedicated higher-layer control signaling includes a RRC connection setup message and an RRC connection reconfiguration message.

With reference to any one of the third aspect or the first to the sixth possible implementations of the third aspect, in a seventh possible implementation of the third aspect, the indication information determined by the third determining module is bit string information.

With reference to any one of the third aspect or the first to the seventh possible implementations of the third aspect, in an eighth possible implementation of the third aspect, the signature sequence is a LDS sequence.

With reference to the eighth possible implementation of the third aspect, in a ninth possible implementation of the third aspect, a quantity of zero elements included in the signature sequence is greater than or equal to a quantity of non-zero elements.

With reference to any one of the third aspect or the first to the ninth possible implementations of the third aspect, in a tenth possible implementation of the third aspect, the apparatus is a network device.

According to a fourth aspect, an indication information transmission apparatus is provided, where the apparatus includes: a receiving module, configured to receive indication information transmitted by a network device, where the indication information is used to indicate a first signature sequence and a first modulation constellation that are used to transmit a first downlink data stream by the network device, and one or more second signature sequences and one or more second modulation constellations that are used to transmit a second downlink data stream by the network device, where the second downlink data stream is one or more downlink data streams, other than the first downlink data stream, that are carried on a time-frequency resource used by the first downlink data stream, each signature sequence is a multi-dimensional complex-number vector including at least one zero element and at least one non-zero element, and the signature sequence is used to perform amplitude and phase adjustment on a modulation symbol obtained after the network device performs constellation mapping on a downlink data stream by using a modulation constellation; a determining module, configured to determine the first signature sequence, the first modulation constellation, the one or more second signature sequences, and the one or more second modulation constellations according to the indication information received by the receiving module; and a decoding module, configured to decode, according to the first signature sequence, the first modulation constellation, the one or more second signature sequences, and the one or more second modulation constellations that are determined by the determining module, the first downlink data stream transmitted by the network device.

With reference to the fourth aspect, in a first possible implementation of the fourth aspect, the indication information received by the receiving module includes first signature matrix information, first signature sequence information, and first indication information, where the first signature matrix information is used to indicate a first signature matrix, the first signature sequence information is used to indicate the first signature sequence in the first signature matrix, the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences; and the determining module is specifically configured to determine, according to the first signature matrix information, the first signature sequence information, and the first indication information, the first signature sequence in the first signature matrix, the first modulation constellation, the one or more second signature sequences in the first signature matrix and the one or more second modulation constellations corresponding to the one or more second signature sequences, where each signature matrix includes two or more signature sequences.

With reference to the first possible implementation of the fourth aspect, in a second possible implementation of the fourth aspect, the first indication information received by the receiving module includes: first modulation constellation information, second signature sequence information, and second modulation constellation information, where the first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

With reference to the first possible implementation of the fourth aspect, in a third possible implementation of the fourth aspect, the first indication information received by the receiving module includes M groups of bit string information corresponding to signature sequences in the first signature matrix in a one-to-one manner; each group of bit string information is used to indicate whether a corresponding signature sequence is the first signature sequence or the one or more second signature sequences; and when a signature sequence corresponding to the group of bit string information is the first signature sequence or the one or more second signature sequences, the group of bit string information is further used to indicate the first modulation constellation or the one or more second modulation constellations corresponding to the corresponding signature sequence, where M is a quantity of signature sequences included in the first signature matrix.

With reference to the second or the third possible implementation of the fourth aspect, in a fourth possible implementation of the fourth aspect, the first indication information received by the receiving module includes modulation order information of the first modulation constellation and modulation order information of the one or more second modulation constellations.

With reference to any one of the fourth aspect or the first to the fourth possible implementations of the fourth aspect, in a fifth possible implementation of the fourth aspect, the receiving module is specifically configured to receive, from the network device, a downlink scheduling message, dedicated higher-layer control signaling, or a system broadcast message, where the downlink scheduling message, the dedicated higher-layer control signaling, and the system broadcast message include the indication information.

With reference to the fifth possible implementation of the fourth aspect, in a sixth possible implementation of the fourth aspect, the dedicated higher-layer control signaling includes a RRC connection setup message and an RRC connection reconfiguration message.

With reference to any one of the fourth aspect or the first to the sixth possible implementations of the fourth aspect, in a seventh possible implementation of the fourth aspect, the indication information received by the receiving module is bit string information.

With reference to any one of the fourth aspect or the first to the seventh possible implementations of the fourth aspect, in an eighth possible implementation of the fourth aspect, the signature sequence is a LDS sequence.

With reference to the eighth possible implementation of the fourth aspect, in a ninth possible implementation of the fourth aspect, a quantity of zero elements included in the signature sequence is greater than or equal to a quantity of non-zero elements.

With reference to any one of the fourth aspect or the first to the ninth possible implementations of the fourth aspect, in a tenth possible implementation of the fourth aspect, the apparatus is a terminal device.

According to a fifth aspect, an indication information transmission apparatus is provided, where the apparatus includes: a processor, a memory, a bus system, and a transmitter, where the processor, the memory, and the transmitter are connected by using the bus system, the memory is configured to store an instruction, and the processor is configured to execute the instruction stored in the memory, to control the transmitter to transmit a signal; the processor is configured to: determine a first signature sequence and a first modulation constellation that are used to transmit a first downlink data stream to a terminal device, where each signature sequence is a multi-dimensional complex-number vector including at least one zero element and at least one non-zero element, and the signature sequence is used to perform amplitude and phase adjustment on a modulation symbol obtained after a network device performs constellation mapping on a downlink data stream by using a modulation constellation; determine one or more second signature sequences and one or more second modulation constellations that are used to transmit a second downlink data stream, where the second downlink data stream is one or more downlink data streams, other than the first downlink data stream, that are carried on a time-frequency resource used by the first downlink data stream; and determine indication information that is used to indicate the first signature sequence, the first modulation constellation, the one or more second signature sequences, and the one or more second modulation constellations; and the transmitter is configured to transmit the indication information to the terminal device.

With reference to the fifth aspect, in a first possible implementation of the fifth aspect, that the processor determines the indication information that is used to indicate the first signature sequence, the first modulation constellation, the one or more second signature sequences, and the one or more second modulation constellations includes: determining that the first signature sequence and the one or more second signature sequences belong to a first signature matrix, where each signature matrix includes two or more signature sequences; and determining that the indication information includes first signature matrix information, first signature sequence information, and first indication information, where the first signature matrix information is used to indicate the first signature matrix, the first signature sequence information is used to indicate the first signature sequence in the first signature matrix, the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences.

With reference to the first possible implementation of the fifth aspect, in a second possible implementation of the fifth aspect, the first indication information determined by the processor includes: first modulation constellation information, second signature sequence information, and second modulation constellation information, where the first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

With reference to the first possible implementation of the fifth aspect, in a third possible implementation of the fifth aspect, the first indication information determined by the processor includes M groups of bit string information corresponding to signature sequences in the first signature matrix in a one-to-one manner; each group of bit string information is used to indicate whether a corresponding signature sequence is the first signature sequence or the one or more second signature sequences; and when a signature sequence corresponding to the group of bit string information is the first signature sequence or the one or more second signature sequences, the group of bit string information is further used to indicate the first modulation constellation or the one or more second modulation constellations corresponding to the corresponding signature sequence, where M is a quantity of signature sequences included in the first signature matrix.

With reference to the second or the third possible implementation of the fifth aspect, in a fourth possible implementation of the fifth aspect, the first indication information determined by the processor includes modulation order information of the first modulation constellation and modulation order information of the one or more second modulation constellations.

With reference to any one of the fifth aspect or the first to the fourth possible implementations of the fifth aspect, in a fifth possible implementation of the fifth aspect, that the transmitter transmits the indication information to the terminal device includes: transmitting, to the terminal device, a downlink scheduling message, dedicated higher-layer control signaling, or a system broadcast message, where the downlink scheduling message, the dedicated higher-layer control signaling, and the system broadcast message include the indication information.

With reference to the fifth possible implementation of the fifth aspect, in a sixth possible implementation of the fifth aspect, the dedicated higher-layer control signaling includes a RRC connection setup message and an RRC connection reconfiguration message.

With reference to any one of the fifth aspect or the first to the sixth possible implementations of the fifth aspect, in a seventh possible implementation of the fifth aspect, the indication information determined by the processor is bit string information.

With reference to any one of the fifth aspect or the first to the seventh possible implementations of the fifth aspect, in an eighth possible implementation of the fifth aspect, the signature sequence is a LDS sequence.

With reference to the eighth possible implementation of the fifth aspect, in a ninth possible implementation of the fifth aspect, a quantity of zero elements included in the signature sequence is greater than or equal to a quantity of non-zero elements.

With reference to any one of the fifth aspect or the first to the ninth possible implementations of the fifth aspect, in a tenth possible implementation of the fifth aspect, the apparatus is a network device.

According to a sixth aspect, an indication information transmission apparatus is provided, where the apparatus includes: a processor, a memory, a bus system, and a receiver, where the processor, the memory, and the receiver are connected by using the bus system, the memory is configured to store an instruction, and the processor is configured to execute the instruction stored in the memory, to control the receiver to receive a signal; the receiver is configured to receive indication information transmitted by a network device, where the indication information is used to indicate a first signature sequence and a first modulation constellation that are used to transmit a first downlink data stream by the network device, and one or more second signature sequences and one or more second modulation constellations that are used to transmit a second downlink data stream by the network device, where the second downlink data stream is one or more downlink data streams, other than the first downlink data stream, that are carried on a time-frequency resource used by the first downlink data stream, each signature sequence is a multi-dimensional complex-number vector including at least one zero element and at least one non-zero element, and the signature sequence is used to perform amplitude and phase adjustment on a modulation symbol obtained after the network device performs constellation mapping on a downlink data stream by using a modulation constellation; and the processor is configured to: determine the first signature sequence, the first modulation constellation, the one or more second signature sequences, and the one or more second modulation constellations according to the indication information; and decode, according to the first signature sequence, the first modulation constellation, the one or more second signature sequences, and the one or more second modulation constellations, the first downlink data stream transmitted by the network device.

With reference to the sixth aspect, in a first possible implementation of the sixth aspect, the indication information received by the receiver includes first signature matrix information, first signature sequence information, and first indication information, where the first signature matrix information is used to indicate a first signature matrix, the first signature sequence information is used to indicate the first signature sequence in the first signature matrix, the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences; and that the processor determines the first signature sequence, the first modulation constellation, the one or more second signature sequences, and the one or more second modulation constellations according to the indication information includes: determining, according to the first signature matrix information, the first signature sequence information, and the first indication information, the first signature sequence in the first signature matrix, the first modulation constellation, the one or more second signature sequences in the first signature matrix and the one or more second modulation constellations corresponding to the one or more second signature sequences, where each signature matrix includes two or more signature sequences.

With reference to the first possible implementation of the sixth aspect, in a second possible implementation of the sixth aspect, the first indication information received by the receiver includes: first modulation constellation information, second signature sequence information, and second modulation constellation information, where the first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

With reference to the first possible implementation of the sixth aspect, in a third possible implementation of the sixth aspect, the first indication information received by the receiver includes M groups of bit string information corresponding to signature sequences in the first signature matrix in a one-to-one manner; each group of bit string information is used to indicate whether a corresponding signature sequence is the first signature sequence or the one or more second signature sequences; and when a signature sequence corresponding to the group of bit string information is the first signature sequence or the one or more second signature sequences, the group of bit string information is further used to indicate the first modulation constellation or the one or more second modulation constellations corresponding to the corresponding signature sequence, where M is a quantity of signature sequences included in the first signature matrix.

With reference to the second or the third possible implementation of the sixth aspect, in a fourth possible implementation of the sixth aspect, the first indication information received by the receiver includes modulation order information of the first modulation constellation and modulation order information of the one or more second modulation constellations.

With reference to any one of the sixth aspect or the first to the fourth possible implementations of the sixth aspect, in a fifth possible implementation of the sixth aspect, that the receiver receives the indication information transmitted by the network device includes: receiving, from the network device, a downlink scheduling message, dedicated higher-layer control signaling, or a system broadcast message, where the downlink scheduling message, the dedicated higher-layer control signaling, and the system broadcast message include the indication information.

With reference to the fifth possible implementation of the sixth aspect, in a sixth possible implementation of the sixth aspect, the dedicated higher-layer control signaling includes a RRC connection setup message and an RRC connection reconfiguration message.

With reference to any one of the sixth aspect or the first to the sixth possible implementations of the sixth aspect, in a seventh possible implementation of the sixth aspect, the indication information received by the receiver is bit string information.

With reference to any one of the sixth aspect or the first to the seventh possible implementations of the sixth aspect, in an eighth possible implementation of the sixth aspect, the signature sequence is a LDS sequence.

With reference to the eighth possible implementation of the sixth aspect, in a ninth possible implementation of the sixth aspect, a quantity of zero elements included in the signature sequence is greater than or equal to a quantity of non-zero elements.

With reference to any one of the sixth aspect or the first to the ninth possible implementations of the sixth aspect, in a tenth possible implementation of the sixth aspect, the apparatus is a terminal device.

Based on the foregoing technical solutions, according to the indication information transmission method and apparatus in the embodiments of the present invention, a network device determines a first signature sequence and a first modulation constellation that are used to transmit a first downlink data stream to a terminal device; determines one or more second signature sequences and one or more second modulation constellations that are used to transmit a second downlink data stream by the network device; determines indication information that is used to indicate the first signature sequence, the first modulation constellation, the one or more second signature sequences, and the one or more second modulation constellations; and transmits the indication information to the terminal device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 4 is a schematic flowchart of a method for determining indication information according to an embodiment of the present invention;

FIG. 5 is a schematic flowchart of an indication information transmission method according to another embodiment of the present invention;

DETAILED DESCRIPTION OF ILLUSTRATIVE EMBODIMENTS

Figure 1:
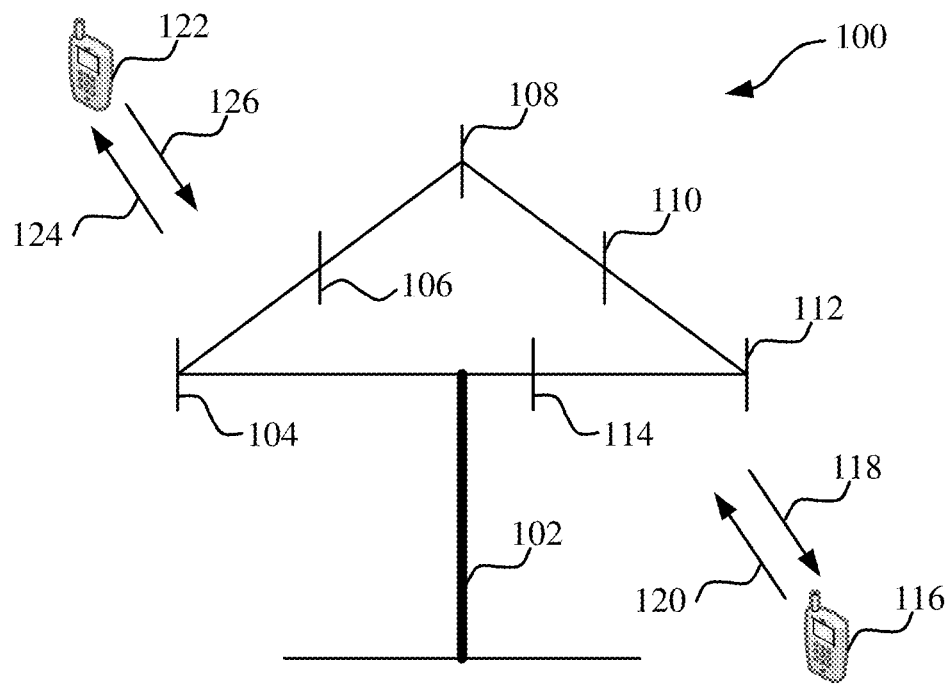
FIG. 1 is a schematic architecture diagram of a communications system applied to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present embodiments.

It should be understood that the technical solutions in the embodiments of the present invention may be applied to various communications systems based on a non-orthogonal multiple access technology, such as a low-density signature (LDS) system. Certainly, the LDS may have another name in the communications field. Further, the technical solutions in the embodiments of the present invention may be applied to multicarrier transmission systems based on the non-orthogonal multiple access technology, such as an orthogonal frequency division multiplexing (OFDM) system, a filter bank multicarrier (FBMC) system, a Generalized Frequency Division Multiplexing (GFDM) system, and a filtered orthogonal frequency division multiplexing (F-OFDM) system that are based on the non-orthogonal multiple access technology. It should be further understood that the embodiments of the present invention merely use an example of a communications system using the LDS technology for description. However, the embodiments of the present invention are not limited thereto.

It should be further understood that, in the embodiments of the present invention, a terminal device may communicate with one or more core networks by using a radio access network (RAN). The terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, or a terminal device in a future fifth generation (5G) network.

It should be further understood that, in the embodiments of the present invention, a network device may be configured to communicate with the terminal device. The network device may be a base station (BTS) in a global system for mobile communications (GSM) system or a Code Division Multiple Access (CDMA) system, or may be a NodeB (NB) in a Wideband Code Division Multiple Access (WCDMA) system, or may be an evolved NodeB (eNB or eNodeB) in a Long Term Evolution (LTE) system. Alternatively, the network device may be a relay station, an access point, a vehicle-mounted device, a wearable device, or a base station device in a future 5G network.

FIG. 1 is a schematic architecture diagram of a communications system applied to an embodiment of the present invention. As shown in FIG. 1, the communications system 100 may include a network device 102. The network device 102 may include one or more antenna sets, and each antenna set may include one or more antennas. For example, one antenna set may include antennas 104 and 106, another antenna set may include antennas 108 and no, and an additional set may include antennas 112 and 114. Although two antennas are shown in each antenna set in FIG. 1, it should be understood that each antenna set may have more or less antennas. The network device 102 may additionally include a transmitter chain and a receiver chain. A person of ordinary skill in the art may understand that both the transmitter chain and the receiver chain may include multiple components (such as a processor, a modulator, a multiplexer, a demodulator, a demultiplexer, or an antenna) related to signal transmitting and signal receiving.

The network device 102 may communicate with multiple terminal devices (such as a terminal device 116 and a terminal device 122). However, it may be understood that the network device 102 may communicate with any quantity of terminal devices similar to the terminal device 116 or the terminal device 122. The terminal devices 116 and 122 may be, for example, cellular phones, smartphones, portable computers, handheld communications devices, handheld computing devices, satellite radio apparatuses, global positioning systems, personal digital assistants (PDAs), and/or any other appropriate devices configured to perform communication in the wireless communications system 100.

As shown in FIG. 1, the terminal device 116 communicates with the antennas 112 and 114. The antennas 112 and 114 transmit information to the terminal device 116 by using a forward link 118, and receive information from the terminal device 116 by using a reverse link 120. In addition, the terminal device 122 communicates with the antennas 104 and 106. The antennas 104 and 106 transmit information to the terminal device 122 by using a forward link 124, and receive information from the terminal device 122 by using a reverse link 126.

For example, in a frequency division duplex (FDD) system, the forward link 118 may use a frequency band different from that of the reverse link 120, and the forward link 124 may use a frequency band different from that of the reverse link 126. For another example, in a time division duplex (TDD) system and a full duplex system, the forward link 118 and the reverse link 120 may use a same frequency band, and the forward link 124 and the reverse link 126 may use a same frequency band.

Each antenna set and/or area designed for communication is referred to as a sector of the network device 102. For example, the antenna set may be designed to communicate with a terminal device in a sector of coverage of the network device 102. In a process in which the network device 102 communicates with the terminal devices 116 and 122 by using the forward links 118 and 124 respectively, a transmit antenna of the network device 102 may increase a signal-to-noise ratio of the forward links 118 and 124 by means of beamforming. In addition, compared with a manner in which a network device transmits a signal to all terminal devices of the network device by using a single antenna, when the network device 102 transmits, by means of beamforming, a signal to the terminal devices 116 and 122 that are randomly situated in related coverage, a mobile device in a neighboring cell receives relatively little interference.

In a given time, the network device 102, and the terminal device 116 or the terminal device 122 may be a wireless communications transmitting apparatus and/or a wireless communications receiving apparatus. When transmitting data, the wireless communications transmitting apparatus may encode data for transmission. Specifically, the wireless communications transmitting apparatus may obtain (for example, generate, receive from another communications apparatus, or store in a memory) a particular quantity of data bits to be transmitted to the wireless communications receiving apparatus by using a channel. Such data bits may be included in a transport block (or multiple transport blocks) of data, and the transport block may be segmented to generate multiple code blocks.

It should be understood that the communications system is a non-orthogonal multiple access system. For example, the system is an LDS system, the network device is, for example, a base station, and the terminal device is, for example, user equipment. The embodiments of the present invention merely use the LDS system, the base station, and the user equipment as examples for description. However, the embodiments of the present invention are not limited thereto.

FIG. 1 shows the communications system applied to the embodiments of the present invention. The communications system is, for example, the LDS system. The following briefly describes an encoding principle at a transmit end of a non-orthogonal multiple access system such as the LDS system with reference to FIG. 2a and FIG. 2b.

Figure 2A:
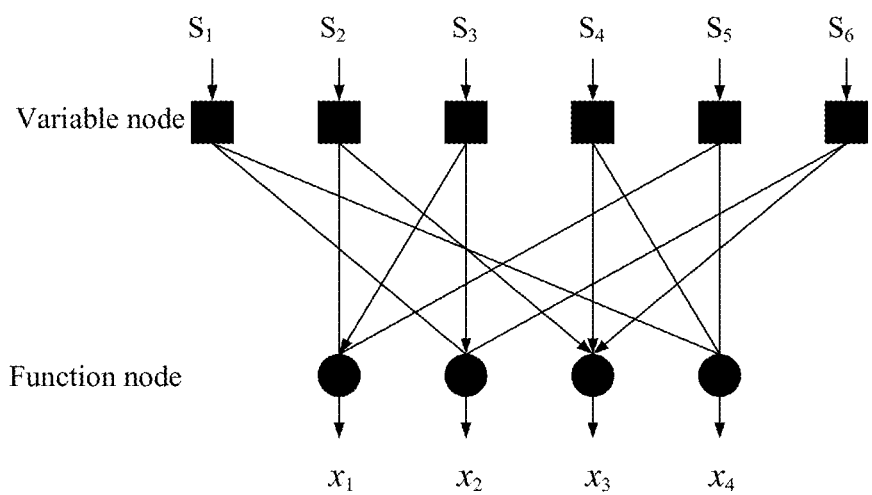
FIG. 2a and FIG. 2b are schematic diagrams of an encoding principle of a non-orthogonal multiple access system.

As shown in FIG. 2a, for example, six data streams reuse four resource units, that is, M=6 and N=4, where M is a positive integer, representing a quantity of data streams; and N is a positive integer, representing a quantity of resource units. A resource unit may be a subcarrier, or a resource element (RE), or an antenna port. The six data streams constitute one group, and the four resource units constitute one encoding unit.

In the bipartite graph shown in FIG. 2a, a connection line between a data stream and a resource unit indicates at least one data combination of the data stream, and a non-zero modulation symbol is transmitted on the resource unit after the data combination has undergone constellation mapping and amplitude and phase adjustment. If there is no connection line between a data stream and a resource unit, it indicates that all modulation symbols transmitted on the resource unit after all possible data combinations of the data stream have undergone constellation mapping and amplitude and phase adjustment are zero modulation symbols. A data combination of data streams may be understood according to the following description. For example, in a binary bit data stream, 00, 01, 10, and 11 are all possible data combinations of two-bit data. For convenience of description, s1 to s6 represent to-be-transmitted data combinations of the six data streams in the bipartite graph, and x1 to x4 represent modulation symbols that are transmitted on the four resource units in the bipartite graph.

It may be learnt from the bipartite graph that modulation symbols are transmitted on two or more resource units after data combinations of data streams have undergone constellation mapping and amplitude and phase adjustment. In addition, the modulation symbol transmitted on each resource unit is superposition of modulation symbols after data combinations of two or more data streams have undergone respective constellation mapping and amplitude and phase adjustment. For example, non-zero modulation symbols may be transmitted on resource unit 1 and resource unit 2 after a to-be-transmitted data combination s3 of data stream 3 has undergone constellation mapping and amplitude and phase adjustment. A modulation symbol x3 transmitted on resource unit 3 is superposition of non-zero modulation symbols that are obtained after to-be-transmitted data combinations s2, s4, and s6 of data stream 2, data stream 4, and data stream 6 have undergone respective constellation mapping and amplitude and phase adjustment. A quantity of data streams may be greater than a quantity of resource units. Therefore, the non-orthogonal multiple access system can effectively increase a network capacity, including a quantity of accessible users of a system, spectral efficiency, and the like.

Figure 2B:
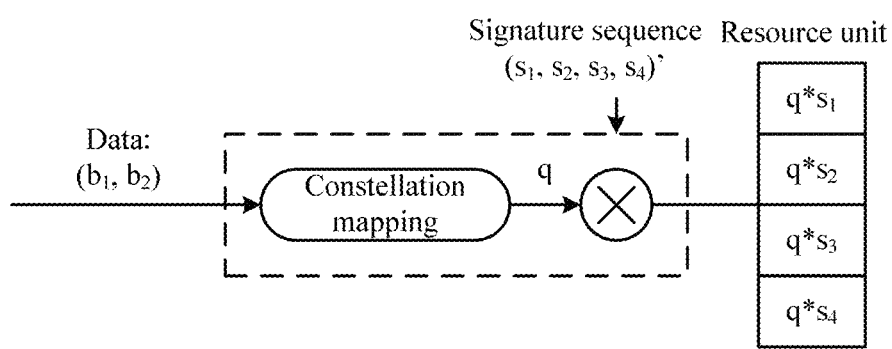

Further, as shown in FIG. 2b, a modulation symbol obtained after data (b1, b2) of a data stream has undergone constellation mapping is q. After phase and amplitude adjustment is performed on the modulation symbol q by using elements in a signature sequence, that is, adjustment factors, modulation symbols transmitted on resource units are obtained, where the modulation symbols are $q*s_1$, $q*s_2$, $q*s_3$, and $q*s_4$, respectively.

The foregoing describes an application scenario of the embodiments of the present invention and the encoding principle with reference to FIG. 1, FIG. 2a, and FIG. 2b. The following describes an indication information transmission method in an embodiment of the present invention from a perspective of a network device side with reference to FIG. 3 and FIG. 4.

Figure 3:
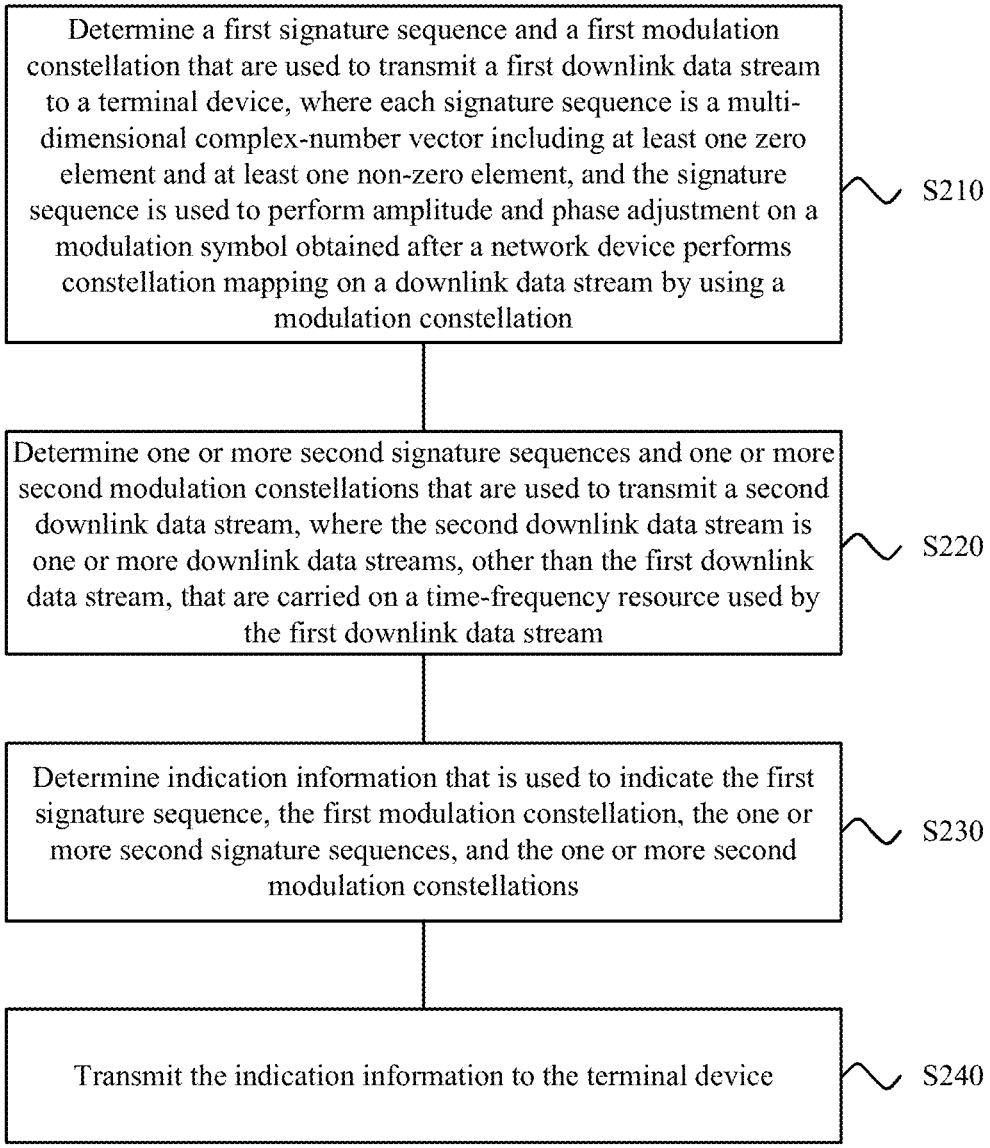
FIG. 3 is a schematic flowchart of an indication information transmission method according to an embodiment of the present invention.

FIG. 3 shows an indication information transmission method 200 according to an embodiment of the present invention. The method 200 may be executed by, for example, a network device in a non-orthogonal multiple access system, and the network device is, for example, a base station. As shown in FIG. 3, the method 200 includes the following steps:

S210. Determine a first signature sequence and a first modulation constellation that are used to transmit a first downlink data stream to a terminal device, where each signature sequence is a multi-dimensional complex-number vector including at least one zero element and at least one non-zero element, and the signature sequence is used to perform amplitude and phase adjustment on a modulation symbol obtained after the network device performs constellation mapping on a downlink data stream by using a modulation constellation.

S220. Determine one or more second signature sequences and one or more second modulation constellations that are used to transmit a second downlink data stream, where the second downlink data stream is one or more downlink data streams, other than the first downlink data stream, that are carried on a time-frequency resource used by the first downlink data stream.

S230. Determine indication information that is used to indicate the first signature sequence, the first modulation constellation, the one or more second signature sequences, and the one or more second modulation constellations.

S240. Transmit the indication information to the terminal device

Specifically, in the non-orthogonal multiple access system such as an LDS system, the network device allocates or specifies a signature sequence and a modulation constellation to or for one or more to-be-received downlink data streams of each terminal device. If the terminal device needs to appropriately receive or decode a downlink data stream that is transmitted by the network device to the terminal device, the terminal device not only needs to learn a signature sequence and a modulation constellation that are used to transmit the downlink data stream by the network device, but also needs to learn one or more signature sequences and one or more modulation constellations that are used to transmit another downlink data stream on a time-frequency resource used by the network device to transmit the downlink data stream.

Therefore, the network device may determine a first signature sequence and a first modulation constellation that are used to transmit a first downlink data stream to the terminal device, and determine one or more second signature sequences and one or more second modulation constellations that are used to transmit a second downlink data stream to another one or more terminal devices. The second downlink data stream is one or more downlink data streams, other than the first downlink data stream, that are carried on a time-frequency resource used by the first downlink data stream. In addition, the network may transmit the indication information to the terminal device. The indication information is used to indicate the first signature sequence, the first modulation constellation, the one or more second signature sequences, and the one or more second modulation constellations that are used to receive the first downlink data by the terminal device.

After receiving the indication information transmitted by the network device, the terminal device may determine, according to the indication information, the first signature sequence and the first modulation constellation that are used to transmit the first downlink data stream by the network device, and the one or more second signature sequences and the one or more second modulation constellations that are used to transmit another second downlink data stream on a same time-frequency resource that is used to transmit the first downlink data stream by the network device. In this way, the terminal device can receive or decode, according to the first signature sequence, the first modulation constellation, the one or more second signature sequences, and the one or more second modulation constellations, the first downlink data stream transmitted by the network device. Therefore, the network device and the terminal device exchange information, so that the terminal device can determine signature sequences and modulation constellations that are used by all downlink data streams carried on a same time-frequency resource. In this way, the network device and the terminal device can perform downlink data stream transmission based on the signature sequences and the modulation constellations, and can effectively increase a system network capacity.

Therefore, according to the indication information transmission method in this embodiment of the present invention, a network device determines a first signature sequence and a first modulation constellation that are used to transmit a first downlink data stream to a terminal device; determines one or more second signature sequences and one or more second modulation constellations that are used to transmit a second downlink data stream by the network device; determines indication information that is used to indicate the first signature sequence, the first modulation constellation, the one or more second signature sequences, and the one or more second modulation constellations; and transmits the indication information to the terminal device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity.

In this embodiment of the present invention, in a non-orthogonal multiple access technology such as an LDS technology, a signature sequence (Signature Sequence) is used to transmit multiple different data streams on a same resource unit. That is, the multiple different data streams reuse a same resource unit. Data streams may use different signature sequences, so that resource utilization is improved. The data streams may come from a same terminal device or from different terminal devices.

The signature sequence may be represented as a multi-dimensional complex-number vector. The complex-number vector may have two or more dimensions. The signature sequence may include at least one zero element and at least one non-zero element. Each dimension of the complex-number vector of the signature sequence may represent a resource unit. A corresponding element may be understood as an adjustment factor, and is used to perform amplitude and phase adjustment on a modulation symbol obtained after data of a data stream has undergone constellation mapping. For example, the adjustment method may be that the modulation symbol obtained after the data of the data stream has undergone constellation mapping is multiplied by the adjustment factor. The modulation symbol on which adjustment is performed by using multiple adjustment factors is transmitted on corresponding resource units, so that data is extensively transmitted on multiple resource units. The data may be binary bit data or multivariate data. The resource unit may be a resource unit in a time domain, a frequency domain, a space domain, a time-frequency domain, a time-space domain, or a time-frequency-space domain.

With reference to the foregoing descriptions, an encoding principle of the non-orthogonal multiple access technology may be exemplarily illustrated by using FIG. 2b. In the example shown in FIG. 2b, the signature sequence may be represented as:

$$\begin{pmatrix} s_1 \\ s_2 \\ s_3 \\ s_4 \end{pmatrix}.$$

There are four dimensions in a multi-dimensional complex-number vector represented by the signature sequence, representing four resource units. In addition, in the four elements of the signature sequence, there is at least one group of i and j, where $1 \leq i \neq j \leq 4$, so that $s_i=0$ and $s_j \neq 0$. A modulation symbol obtained after data (b1, b2) of a data stream has undergone constellation mapping is q. After phase and amplitude adjustment is performed on q by using elements in the signature sequence, that is, adjustment factors, modulation symbols transmitted on resource units are obtained, where the modulation symbols are $q*s_1$, $q*s_2$, $q*s_3$, and $q*s_4$, respectively.

More generally, the signature sequence may be represented in the following form:

$$\begin{pmatrix} s_{1,m} \\ s_{2,m} \\ \vdots \\ s_{N,m} \end{pmatrix}, 1 \leq m \leq M,$$

where $s_{n,m}$ represents an element in the signature sequence; m and n are natural numbers; $1 \leq n \leq N, 1 \leq m \leq M$; N represent N resource units in an encoding unit; M represents a quantity of data streams reused in a group; $s_{n,m}=\alpha*\exp(j*\beta), 1 \leq n \leq N, 1 \leq m \leq M$; $\alpha$ and $\beta$ may be any real numbers; M and N are integers greater than 1; there is at least one group of i and j; and $1 \leq i \neq j \leq N$, so that $s_{i,m}=0$ and $s_{j,m} \neq 0$.

In the non-orthogonal multiple access system, M signature sequences may constitute a signature matrix. The signature matrix may be, for example, in the following form:

$$\begin{pmatrix} s_{1,1} & s_{1,2} & \cdots & s_{1,M} \\ s_{2,1} & s_{2,2} & \cdots & s_{2,M} \\ \vdots & \vdots & \cdots & \vdots \\ s_{N,1} & s_{N,2} & \cdots & s_{N,M} \end{pmatrix}_{N \times M}.$$

Therefore, in this embodiment of the present invention, the signature matrix includes one or more signature sequences. The signature sequence is a multi-dimensional complex-number vector including at least one zero element and at least one non-zero element. The signature sequence is used to perform amplitude and phase adjustment on a modulation symbol that is obtained after the terminal device or the network device performs constellation mapping on a data stream by using a modulation constellation.

It should be further understood that, when this embodiment of the present invention is applied, it further needs to assume that the network device and the terminal device in the non-orthogonal multiple access system both store some or all of the following pre-designed content: (i) One or more signature matrices:

$$\begin{pmatrix} s_{1,1} & s_{1,2} & \cdots & s_{1,M} \\ s_{2,1} & s_{2,2} & \cdots & s_{2,M} \\ \vdots & \vdots & \cdots & \vdots \\ s_{N,1} & s_{N,2} & \cdots & s_{N,M} \end{pmatrix}_{N \times M},$$

where $s_{n,m}=\alpha*\exp(j*\beta), 1 \leq n \leq N, 1 \leq m \leq M$, $\alpha$ and $\beta$ may be any real numbers; M and N both are integers greater than 1; in addition, for each m, $1 \leq m \leq M$; there is at least one group of $i_m$ and $j_m$; and $1 \leq i_m \neq j_m \leq M$, so that $s_{i_m,m}=0$ and $s_{j_m,m} \neq 0$; (2) One or more signature sequences:

$$\begin{pmatrix} s_{1,m} \\ s_{2,m} \\ \vdots \\ s_{N,m} \end{pmatrix},$$

where $1 \leq m \leq M$; and (3) One or more modulation constellations: $\{q_1, q_2, \ldots, q_{Q_m}\}$, where $Q_m \geq 2$, and each modulation constellation is corresponding to a modulation order.

With reference to FIG. 4, the following details the method 230 for determining indication information according to this embodiment of the present invention.

As shown in FIG. 4, in this embodiment of the present invention, optionally, the determining indication information that is used to indicate the first signature sequence, the first modulation constellation, the one or more second signature sequences, and the one or more second modulation constellations includes the following steps:

S231. Determine that the first signature sequence and the one or more second signature sequences belong to a first signature matrix, where each signature matrix includes two or more signature sequences.

S232. Determine that the indication information includes first signature matrix information, first signature sequence information, and first indication information, where the first signature matrix information is used to indicate the first signature matrix, the first signature sequence information is used to indicate the first signature sequence in the first signature matrix, the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences.

Specifically, in this embodiment of the present invention, the network device and the terminal device may store a signature matrix, a signature sequence, and a modulation constellation that are pre-designed. Alternatively, the network device and the terminal device may store a signature matrix and a modulation constellation that are pre-designed. A column of the signature matrix is a signature sequence. Therefore, in this embodiment of the present invention, storing the signature matrix also means storing a corresponding signature sequence.

In this embodiment of the present invention, the network device allocates the first signature sequence and the first modulation constellation that are used to transmit the first downlink data stream, and the one or more second signature sequences and the corresponding one or more second modulation constellations that are used to transmit the second downlink data stream, where the first signature sequence and the one or more signature sequences are in a same signature matrix. To indicate, to user equipment, the first signature sequence, the first modulation constellation, the one or more second signature sequences, and the one or more second modulation constellations, the network device determines the first signature matrix to which the first signature sequence and the one or more second signature sequences belong. In this way, the network device determines the indication information that is used to indicate the first signature sequence, the first modulation constellation, the one or more second signature sequences, and the one or more second modulation constellations. The indication information may include the first signature matrix information, the first signature sequence information, and the first indication information.

For example, the indication information may include three logical information segments. Logical information segment 1 may carry the first signature matrix information, used to indicate the first signature matrix that is used to transmit the first downlink data stream and the second downlink data stream by the network device. Logical information segment 2 may carry the first signature sequence information, used to indicate the first signature sequence that is in the first signature matrix and that is used to transmit the first downlink data stream by the network device. Logical information segment 3 may carry the first indication information. The first indication information is used to indicate the first modulation constellation corresponding to the first signature sequence. The first indication information is further used to indicate the one or more second signature sequences in the first signature matrix and the one or more second modulation constellations corresponding to the one or more second signature sequences.

It should be understood that in this embodiment of the present invention, the logical information segments of the indication information may be consecutively or non-consecutively present in any sequential order in an instruction in which the indication information is located. This embodiment of the present invention sets no limit thereon.

Correspondingly, after receiving the instruction or a message carrying the indication information, the terminal device may learn, for example, according to logical information segment 1, which signature matrix is used by the network device to transmit the first downlink data stream and the second downlink data stream. The terminal device may learn, according to logical information segment 2, which signature sequence in the signature matrix indicated by logical information segment 1 is used by the network device to transmit the first downlink data stream. The terminal device may learn, according to logical information segment 3, which modulation order or which modulation constellation is used by the network device to transmit the first downlink data stream. In addition, the terminal device may further learn, according to logical information segment 3, which signature sequences in the signature matrix indicated by logical information segment 1 are used by the network device to transmit the second downlink data stream, and which modulation order or which modulation constellation is used by the network device to transmit the second downlink data stream.

In this way, the network device and the terminal device exchange information, so that the terminal device can determine signature sequences and modulation constellations that are used by all downlink data streams carried on a same time-frequency resource. Therefore, the network device and the terminal device can perform downlink data stream transmission based on the signature sequences and the modulation constellations, and can effectively increase a system network capacity, including increasing a quantity of accessible users of a system, spectral efficiency, and the like.

In this embodiment of the present invention, the network device may use multiple manners to indicate, to the terminal device, the first modulation constellation corresponding to the first signature sequence, and indicate, to the terminal device, the one or more second signature sequences in the first signature matrix and the one or more second modulation constellations that are corresponding to the one or more second signature sequences. The following provides descriptions separately.

Optionally, in this embodiment of the present invention, the first indication information includes: first modulation constellation information, second signature sequence information, and second modulation constellation information. The first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

Specifically, in this embodiment of the present invention, for example, logical information segment 3 carrying the first indication information may further include three logical information subsegments: logical information subsegment 1, logical information subsegment 2, and logical information subsegment 3. Logical information subsegment 1 may carry the first modulation constellation information, used to indicate the first modulation constellation corresponding to the first signature sequence. Logical information subsegment 2 may carry the second signature sequence information, used to indicate the one or more second signature sequences in the first signature matrix. Logical information subsegment 3 may carry the second modulation constellation information, used to indicate the one or more second modulation constellations corresponding to the one or more second signature sequences.

In this embodiment of the present invention, each modulation constellation may be corresponding to a modulation order. Therefore, logical information segment 3 may further indicate, in a manner of indicating a modulation order, a modulation constellation used to transmit a downlink data stream by the network device. Correspondingly, the terminal device may learn, according to logical information segment 3, the modulation order corresponding to the to-be-received downlink data stream, so as to determine the modulation constellation corresponding to the modulation order in a one-to-one manner, and receive the downlink data stream.

That is, in this embodiment of the present invention, optionally, the first indication information includes modulation order information of the first modulation constellation and modulation order information of the one or more second modulation constellations. Specifically, in this embodiment of the present invention, logical information subsegment 1 may include the modulation order information of the first modulation constellation, and logical information subsegment 3 may include the modulation order information of the one or more second modulation constellations.

It should be understood that, in this embodiment of the present invention, if the logical information segments indicate index values, the network device side and the terminal device side need to pre-establish consistent index relationships between related information, such as an index relationship between a signature matrix index value and a signature matrix, an index relationship between a signature sequence index value and a signature sequence in each signature matrix, and an index relationship between an modulation constellation index value and each modulation constellation, so that the network device and the terminal device can uniquely determine a corresponding signature matrix, signature sequence, and modulation constellation according to the index values indicated by the logical information segments and according to the pre-established related index relationships.

Optionally, in this embodiment of the present invention, the first indication information includes M groups of bit string information corresponding to signature sequences in the first signature matrix in a one-to-one manner. Each group of bit string information is used to indicate whether a corresponding signature sequence is the first signature sequence or the one or more second signature sequences. When a signature sequence corresponding to the group of bit string information is the first signature sequence or the one or more second signature sequences, the group of bit string information is further used to indicate the first modulation constellation or the one or more second modulation constellations corresponding to the corresponding signature sequence. M is a quantity of signature sequences included in the first signature matrix.

In this embodiment of the present invention, each modulation constellation may be corresponding to a modulation order. Therefore, the network device may further indicate, in a manner of indicating a modulation order, a modulation constellation used to receive a downlink data stream by the network device. Correspondingly, the terminal device may learn the modulation order corresponding to the to-be-received downlink data stream, so as to determine the modulation constellation corresponding to the modulation order in a one-to-one manner, and receive the downlink data stream.

That is, in this embodiment of the present invention, optionally, the first indication information includes modulation order information of the first modulation constellation and modulation order information of the one or more second modulation constellations.

Specifically, in this embodiment of the present invention, for example, the indication includes the first signature matrix information, the first signature sequence information, and the first indication information. Assuming that there are $K_1 \geq 1$ signature matrices, logical information segment 1 may be represented by using a bitmap $$\overline{b_1, b_2, \ldots, b_{L_1}}^{L_1}$$

that includes $L_1 = \text{ceil}(\log_2 K_1)$ bits, and is used to indicate the first signature matrix that is used to transmit the first downlink data stream and the second downlink data stream by the network device. Assuming that the first signature matrix totally includes $K_2 \geq 1$ signature sequences, logical information segment 2 may be represented by using a bitmap:

$$\overline{b_1, b_2, \ldots, b_{L_2}}^{L_2}$$

that includes $L_2 = \text{ceil}(\log_2(K_2))$ bits, and is used to indicate the first signature sequence that is used to transmit the first downlink data stream of the terminal device by the network device.

For another example, assuming that the first signature matrix indicated by logical information segment 1 totally includes $K_2 \geq 1$ signature sequences, and each signature sequence may have $K_3 \geq 1$ available modulation orders, when the network device may use different modulation orders to transmit different downlink data streams, logical information segment 3 may include $K_2$ groups of bit string information. Each group of bit string information may include $L_3$ bits, and indicates whether a signature sequence corresponding to the group of bit string information is the first signature sequence or the one or more second signature sequences. In addition, if the signature sequence corresponding to the group of bit string information is the first signature sequence or the one or more second signature sequences, the group of bit string information is further used to indicate the first modulation constellation or the one or more second modulation constellations corresponding to the corresponding signature sequence. That is, logical information segment 3 may be represented by using a bitmap:

$$\overline{\overline{b_{1,1}, b_{2,1}, \ldots, b_{L_3,1}}^{L_3}, \overline{b_{1,2}, b_{2,2}, \ldots, b_{L_3,2}}^{L_3}, \ldots, \overline{b_{1,K_3}, b_{2,K_3}, \ldots, b_{L_3,K_2}}^{L_3}}^{K_2 * L_3}$$

that includes $K_2 * L_3$ ($L_3 = \text{ceil}(\log_2(K_3))$) bits, where the $k^{th}$ group of bit segments:

$$\frac{L_3}{b_{1,k}, b_{2,k}, \ldots, b_{L_3,k}}$$

indicates whether the network device uses a signature sequence corresponding to the $k^{th}$ group of bit segments to transmit a downlink data stream, that is, indicates whether the signature sequence corresponding to the group of bit string information is the first signature sequence or the one or more second signature sequences. For example, the network device may use an all-zeros bit to indicate that the signature sequence corresponding to the $k^{th}$ group of bit segments is not used; correspondingly, the network device may use a non-all-zeros bit to indicate that the signature sequence corresponding to the $k^{th}$ group of bit segments is used. For another example, the network device may use an all-ones bit to indicate that the signature sequence corresponding to the $k^{th}$ group of bit segments is not used, and the network device may use a non-all-ones bit to indicate that the signature sequence corresponding to the $k^{th}$ group of bit segments is used. When the network device uses the signature sequence corresponding to the $k^{th}$ group of bit segments to transmit a downlink data stream, the $k^{th}$ group of bit segments may further indicate that the network device uses the first modulation constellation or the one or more second modulation constellations corresponding to the corresponding signature sequence, for example, the $k^{th}$ group of bit segments may include modulation order information of the used modulation constellation.

It should be understood that, in this embodiment of the present invention, when the network device uses each signature sequence in the first signature matrix to transmit a downlink data stream, that is, the used signature sequences all belong to the first signature sequence or the one or more second signature sequences, the first indication information may include M groups of bit string information in a one-to-one correspondence with the signature sequences in the first signature matrix. Each group of bit string information may be used to indicate only the first modulation constellation or the one or more second modulation constellations corresponding to the corresponding signature sequence. M is a quantity of signature sequences included in the first signature matrix. That is, each group of bit string information may be used to indicate only modulation order information corresponding to the corresponding signature sequence. Further, when the network device uses a same modulation order to transmit different downlink data streams by default, logical information segment 3 may be represented by using a bitmap:

$$\frac{L_3}{b_1, b_1, \ldots, b_{L_3}}$$

that includes $L_3$ bits, and is used to indicate the modulation order that is used to transmit the downlink data stream by the network device.

It should be further understood that, in this embodiment of the present invention, the network device and the terminal device may use multiple methods to pre-store a signature matrix. A simple and direct method is storing all included zero elements and non-zero elements in a manner described above:

$$\begin{pmatrix} s_{1,1} & s_{1,2} & \cdots & s_{1,M} \\ s_{2,1} & s_{2,2} & \cdots & s_{2,M} \\ \vdots & \vdots & \cdots & \vdots \\ s_{N,1} & s_{N,2} & \cdots & s_{N,M} \end{pmatrix}_{N \times M}.$$

This embodiment of the present invention merely uses the example to describe storage of the signature matrix. However, it should be understood that this embodiment of the present invention is not limited thereto, and the network device and the terminal device may use another method to pre-store the signature matrix.

It should be further understood that this embodiment of the present invention merely uses the foregoing solution as an example for description. However, the present invention is not limited thereto. For example, when signature sequences that are used to transmit uplink data by the terminal device and that are determined by the network device all belong to a same signature matrix or when a same signature matrix is used by default, the indication information may include only the first signature sequence information and the first indication information. For another example, when signature sequences that are used to transmit uplink data by the terminal device and that are determined by the network device all are signature sequences with fixed serial numbers by default, the indication information may include only the first signature matrix information and the first indication information. For another example, when modulation constellations that are used to transmit uplink data by the terminal device and that are determined by the network device all are fixed modulation constellations by default, the indication information may include only the first signature matrix information, the first signature sequence information, and the second signature sequence information.

In this way, the network device may use less information to indicate the signature matrix and the modulation constellation that are used to receive the downlink data stream by the terminal device. Therefore, according to the method, a system network capacity can be effectively increased, and further, system overheads can be reduced.

It should be understood that the present disclosure merely uses the embodiment shown in FIG. 4 as an example for description. However, the present embodiments are not limited thereto, and another method may be used to indicate, to the terminal device, a signature sequence and a modulation constellation that are allocated or specified by the network device.

Therefore, according to the indication information transmission method in this embodiment of the present invention, a network device determines a first signature sequence and a first modulation constellation that are used to transmit a first downlink data stream to a terminal device; determines one or more second signature sequences and one or more second modulation constellations that are used to transmit a second downlink data stream by the network device; determines indication information that is used to indicate the first signature sequence, the first modulation constellation, the one or more second signature sequences, and the one or more second modulation constellations; and transmits the indication information to the terminal device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity.

In addition, the network device can use less information to indicate a signature matrix and a modulation constellation that are used to receive the downlink data stream by the terminal device. Therefore, according to the method, a system network capacity can be effectively increased, and further, system overheads can be reduced.

In this embodiment of the present invention, the network device may transmit the indication information to the terminal device in multiple manners. For example, the network device may transmit the indication information to the terminal device in a dynamic or semi-persistent manner by using a downlink control channel. Alternatively, the network device may transmit the indication information to the terminal device in a semi-persistent manner by using a data channel. Alternatively, the network device may transmit the indication information to the terminal device in a persistent manner by using a broadcast channel or a data channel.

Optionally, in this embodiment of the present invention, the transmitting the indication information to the terminal device includes: transmitting, to the terminal device, a downlink scheduling message, dedicated higher-layer control signaling, or a system broadcast message. The downlink scheduling message, the dedicated higher-layer control signaling, and the system broadcast message include the indication information.

Specifically, in this embodiment of the present invention, for example, the network device may allocate to or specify for a downlink data stream of the terminal device according to channel status information that is reported periodically or non-periodically, a signature sequence, a modulation constellation, and another system resource and parameter such as a frequency resource, a transmit power, and a modulation and coding scheme; and may use the allocated or specified signature sequence and modulation constellation together with the another system resource and parameter as downlink control information (DCI), add the DCI to the downlink scheduling message, and transmit the downlink scheduling message to the terminal device.

After receiving the downlink scheduling message transmitted by the network device, the terminal device may receive, according to the signature sequence, the modulation constellation, and the another system resource and parameter that are indicated by the downlink scheduling message, the first downlink data stream by using the non-orthogonal multiple access technology.

In the foregoing procedure, the indication information may be used as a part of the downlink control information (DCI), added to the downlink scheduling message, and transmitted to the terminal device in a dynamic or semi-persistent (Semi-Persistent) manner by using a physical downlink control channel, for example, a physical downlink control channel (PDCCH) in a Long Term Evolution (LTE) system.

For another example, the indication information may be added to a radio resource control (Radio Resource Control, "RRC" for short) connection setup message or an RRC connection reconfiguration message, and transmitted to the terminal device in a semi-persistent manner by using a physical downlink data channel, for example, a physical downlink shared channel (PDSCH) in the LTE system.

Optionally, the dedicated higher-layer control signaling includes a radio resource control (RRC) connection setup message and an RRC connection reconfiguration message. It should be understood that, this embodiment of the present invention merely uses that the dedicated higher-layer control signaling includes the RRC connection setup message and the RRC connection reconfiguration message as an example for description. However, the present embodiments are not limited thereto, and other dedicated higher-layer control signaling may be used to transmit the indication information to the terminal device.

For another example, the indication information may be added to the system broadcast message, for example, a master information block (MIB) or a system information block (SIB) in the LTE system, and transmitted to the terminal device in a persistent manner by using a physical downlink broadcast channel or a physical downlink data channel, for example, a physical broadcast channel (PBCH) or a physical downlink shared channel PDSCH in the LTE system.

In this embodiment of the present invention, the network device transmits the indication information to the terminal device in at least one of a bit string manner or a tabular manner. Optionally, the indication information is bit string information.

Specifically, in this embodiment of the present invention, the logical information segment in the indication information may be implemented by using multiple methods, including but not limited to the following:

Manner 1: The logical information segment uses an independent bit string or a bitmap to implement an information indication function.

In the embodiment described above, assuming that information indicated by a logical information segment in the indication information (for example, the logical information segment is used to indicate a signature matrix) has K possibilities at maximum (for example, there are totally K signature matrices), the logical information segment may be represented by using a bitmap:

$$\overbrace{b_1, b_2, \ldots, b_L}^{L}$$

that includes $L=\mathrm{ceil}(\log_2(K))$ bits, where $\mathrm{ceil}(\cdot)$ represents rounding up to an integer. A value in the bitmap represents one index value of the indication information. The terminal device may determine, according to the index value represented by the bitmap and a pre-established index relationship, a unique possibility corresponding to the index value.

For example, the indication information includes the first signature matrix information, the first signature sequence information, and the first indication information. Assuming that there are $K_1 \geq 1$ signature matrices, logical information segment 1 may be represented by using a bitmap:

$$\overbrace{b_1, b_2, \ldots, b_{L_1}}^{L_1}$$

that includes $L_1=\mathrm{ceil}(\log_2(K_1))$ bits, and is used to indicate the first signature matrix that is used to transmit the first downlink data stream and the second downlink data stream by the network device. Assuming that the first signature matrix indicated by logical information segment 1 includes $K_2 \geq 1$ signature sequences, and $K_3 \geq 1$ modulation orders may be used, when the network device may use different modulation orders to transmit different downlink data streams, logical information segment 3 may be represented by using a bitmap:

$$\frac{K_2 * L_3}{b_{1,1}, b_{2,1}, \ldots, b_{L_3,1}, b_{1,2}, b_{2,2}, \ldots, b_{L_3,2}, \ldots, b_{1,K_3}, b_{2,K_3}, \ldots, b_{L_3,K_2}}$$

that includes $K_2 * L_3$ ($L_3$=ceil ($\log_2 (K_3)$)) bits. If the $k^{th}$ bit segment is an agreed bit combination in a specified form, for example, all zeros or all ones, it indicates that the network device does not use the $k^{th}$ signature sequence of the signature matrix indicated by logical information segment 1 to transmit a downlink data stream. Otherwise, the $k^{th}$ bit segment:

$$\frac{L_3}{b_{1,k}, b_{2,k}, \ldots, b_{L_3,k}}$$

indicates that the network device uses the corresponding $k^{th}$ signature sequence to transmit a downlink data stream, and further indicates a modulation order used by the downlink data stream that is transmitted by the network device by using the $k^{th}$ signature sequence (the $k^{th}$ column) in the first signature matrix indicated by logical information segment 1. When the network device uses a same modulation order to transmit different downlink data streams by default, logical information segment 3 may be represented by using a bitmap:

$$\frac{L_3}{b_1, b_1, \ldots, b_{L_3}}$$

that includes $L_3$ bits, and is used to indicate a modulation order used by the downlink data stream that is transmitted by the network device. Logical information segment 2 may be represented by using a bitmap:

$$\frac{L_2}{b_1, b_2, \ldots, b_{L_2}}$$

that includes $L_2$=ceil($\log_2(K_2)$) bits, and is used to indicate the first signature sequence that is used to transmit the first downlink data stream of the terminal device by the network device.

It should be understood that, in the foregoing example, the three logical information segments in the indication information all use independent bit strings or bitmaps to implement the information indication functions. However, actually, it is not required that all the logical information segments use a same implementation. Therefore, in an actual application, some logical information segments may use independent bitmaps to implement information indication functions of the logical information segments, and other logical information segments use other means for implementation. This embodiment of the present invention is not limited thereto.

It should be further understood that the foregoing uses only one specific embodiment of the present invention as an example for description. It should be noted that the method may also be used to implement a logical information segment in indication information of another embodiment of the present invention.

Manner 2: Multiple logical information segments are combined for indication.

Combined indication of the logical information segments may be generally implemented in a tabular form. A table may be in the following form. The table includes multiple columns, one of the columns is a comprehensive index column, and each index value is corresponding to a combination of information indicated by the multiple logical information segments. Except for the comprehensive index column, each of the other columns in the table may be corresponding to one logical information segment, and is used to indicate a possibility of information indicated by the corresponding logical information segment. A value of the column may be an index value, or may be specific content that is indicated, such as a signature matrix, a signature sequence, a modulation constellation, or a modulation order.

According to the table described above, the network device and the terminal device may establish correspondences between a comprehensive index value and all possible combinations of information indicated by the multiple logical information segments. The network device transmits the comprehensive index value to the terminal device according to the indication information. The terminal device may learn, according to the comprehensive index value by querying the table, a unique possibility corresponding to information indicated by each logical information segment.

The example in which the indication information includes the first signature matrix information, the first signature sequence information, and the first modulation constellation information is still used for description. A tabular form for implementing the indication information is shown in Table 1.

TABLE 1

| Index | Signature matrix or signature matrix index | Signature sequence or signature sequence index | Modulation constellation, modulation constellation index, modulation order, or modulation order index |
|---|---|---|---|
| ... | ... | ... | ... |
| m | i | j | k |
| ... | ... | ... | ... |

As shown in Table 1, a combined indication table of the multiple logical information segments may include four columns. The first column is a comprehensive index column (referred to as an index column in the example), and the other three columns are corresponding to three logical information segments in the indication information respectively. m is an index value. i, j, and k may be index values of information indicated by the logical information segments, or may be specific content of corresponding information, such as a signature matrix, a signature sequence, or a modulation constellation stored in the form described above.

It should be understood that, in the example described above, all the logical information segments in the indication information are combined for indication. Actually, it is not required that all the logical information segments use a same implementation. Therefore, in an actual application, some logical information segments may implement their information indication functions by means of combined indication, and other logical information segments use other means for implementation. This embodiment of the present invention is not limited thereto.

It should be further understood that the foregoing uses only one specific embodiment of the present invention as an example for description. It should be noted that the method may also be used to implement a logical information segment in indication information of another embodiment of the present invention.

Manner 3: A logical information segment is combined with an information segment that has another indication function and that is in a message or an instruction in which the indication information is located, for indication.

This manner is also generally implemented in a tabular form. A table may be in the following form. The table includes multiple columns, one of the columns is a comprehensive index column, and each index value represents a combination of content indicated by the other columns. Except for the comprehensive index column, at least one column in the table is corresponding to a logical information segment in the indication information in this embodiment of the present invention, and represents one possibility of content indicated by the corresponding logical information segment. A value of the column may be an index value, or may be specific content that is indicated, such as a signature matrix, a signature sequence, a modulation constellation, or a modulation order.

At least one of the other columns in the table is corresponding to an information segment with another information (different from the information indicated by the logical information segments in the indication information in this embodiment of the present invention) indication function, such as an information segment indicating a transport block size, or an information segment indicating a redundancy version.

According to the table, the network device and the terminal device may establish correspondences of all possible combinations between a comprehensive index and the information indicated by the logical information segment in the indication information in this embodiment of the present invention, and between the comprehensive index and the information indicated by the information segment with another information indication function. The network device transmits a comprehensive index value according to the indication information. The terminal device may learn, according to the comprehensive index value by querying the table, a unique possibility corresponding to the information indicated by the logical information segment in the indication information in this embodiment of the present invention, and a unique possibility corresponding to information indicated by the information segment with the another information indication function.

It should be understood that the foregoing uses only one specific embodiment of the present invention as an example for description. It should be noted that the method may also be used to implement a logical information segment in indication information of another embodiment of the present invention.

It should be further understood that, in this embodiment of the present invention, the logical information segments in the indication information all are logic concepts. In the message or the instruction in which the indication information is located, such as an uplink scheduling grant message, an RRC connection setup message, an RRC connection reconfiguration message, or a broadcast message, if an information segment or a bit string implements an information indication function of a logical information segment in the foregoing embodiment, it should be understood or considered that the information segment or the bit string is implementation of the corresponding logical information segment in the foregoing embodiment. The information segment or the bit string herein may be any part of all bits that are used to constitute the message or the instruction in which the indication information is located, including an information bit and a check bit, such as a cyclic redundancy check (CRC) bit that is scrambled by using a radio network temporary identifier (RNTI) of the terminal device.

The foregoing details various implementations of the indication information. The following details, by using an example of an LTE system using the non-orthogonal multiple access technology, a specific application of this embodiment of the present invention in the LTE system.

In the LTE system, the network device transmits, by using the downlink scheduling message, the following information segment for each to-be-transmitted uplink transport block (where the transport block is equivalent to data or a data stream in this embodiment of the present invention) of the terminal device, to indicate corresponding information: transport block i, where i=1 or 2: a modulation and coding scheme indication information segment: 5 bits, used to indicate a size of the transport block and a modulation order; a new data indication information segment: 1 bit, used to indicate whether the transport block is retransmitted data or new data; and a redundancy version indication information segment: 2 bits, used to indicate a redundancy version number.

After the LTE system introduces the non-orthogonal multiple access technology, when the information segments are transmitted for each transport block of the terminal device, the one or more logical information segments described in this embodiment of the present invention also need to be transmitted, to indicate indication information. The following describes several applications in the LTE system using the non-orthogonal multiple access technology in this embodiment of the present invention.

In an embodiment in which the indication information includes the first signature matrix information, the first signature sequence information, and the first modulation constellation information, the network device may transmit, by using the downlink scheduling message, the following information segments for a transport block of the terminal device, to indicate corresponding information: transport block i, where i=1 or 2: a signature matrix indication information segment: $L_7$ bits, used to indicate a signature matrix for transmitting the transport block; a signature sequence indication information segment: $L_8$ bits, used to indicate a signature sequence for transmitting the transport block; a modulation and coding scheme and redundancy version information segment: 5 bits, used to indicate a size of the transport block, a modulation order, and a redundancy version number; and a new data indication information segment: 1 bit, used to indicate whether the transport block is retransmitted data or new data.

After receiving and decoding the uplink scheduling grant message, with regard to each transport block, the terminal device may learn, according to the corresponding signature matrix indication information segment, which signature matrix is used to transmit the transport block; may learn, according to the corresponding signature sequence indication information segment, which signature sequence in the signature matrix is used to transmit the transport block; and further, may learn, according to the modulation and coding scheme and redundancy version information segment, a modulation order used to transmit the transport block, and a modulation constellation corresponding to the modulation order, so that the terminal device can transmit the transport block according to the signature sequence and the modulation constellation.

In an embodiment in which the indication information includes the first signature matrix information, the first signature sequence information, and the first indication information, and it is assumed that the network device uses a same modulation order to transmit different downlink data streams of one or more terminal devices by default, the network device may transmit, by using a downlink scheduling message, the following information segment for the transport block of the terminal device, to indicate corresponding information: transport block i, where i=1 or 2: a signature matrix indication information segment: $L_1$ bits, used to indicate a signature matrix for receiving the transport block by the terminal device; a signature sequence indication information segment: $L_2$ bits, used to indicate a first signature sequence for receiving the transport block by the terminal device; a modulation and coding scheme indication information segment: 5 bits, used to indicate a size of the transport block and a modulation order; a new data indication information segment: 1 bit, used to indicate whether the transport block is retransmitted data or new data; and a redundancy version indication information segment: 2 bits, used to indicate a redundancy version number.

After receiving and decoding the downlink scheduling message, with regard to each transport block, the terminal device learns, according to the corresponding signature matrix indication information segment, a first signature matrix used to receive the transport block; learns, according to the modulation and coding scheme indication information segment, a modulation order used to transmit all transport blocks including the transport block of the terminal device by the network device, so that the terminal device can determine signature sequences and modulation orders that are used to transmit all the transport blocks including the transport block of the terminal device by the network device respectively; and further, the terminal device learns, according to the corresponding signature sequence indication information segment, the first signature sequence corresponding to the transport block of the terminal device. In this way, the terminal device can correctly receive the transport block of the terminal device according to the first signature sequence, the first modulation constellation, the one or more second signature sequences, and the one or more second modulation constellations.

In this embodiment of the present invention, optionally, the signature sequence is a low-density signature (LDS) sequence. Optionally, a quantity of zero elements included in the signature sequence is greater than or equal to a quantity of non-zero elements.

It should be understood that the foregoing describes only a specific possible application in the LTE system in this embodiment of the present invention. However, the present embodiments are not limited thereto. In the LTE system using the non-orthogonal multiple access technology, the network device may further transmit another information segment to indicate the indication information.

It should be further understood that serial numbers of the foregoing processes do not denote an execution sequence in the embodiments of the present invention. The execution sequence of the processes should be determined according to functions and internal logic of the processes, and should not be construed as any limitation on the implementation processes of the embodiments of the present invention.

Therefore, according to the indication information transmission method in this embodiment of the present invention, a network device determines a first signature sequence and a first modulation constellation that are used to transmit a first downlink data stream to a terminal device; determines one or more second signature sequences and one or more second modulation constellations that are used to transmit a second downlink data stream by the network device; determines indication information that is used to indicate the first signature sequence, the first modulation constellation, the one or more second signature sequences, and the one or more second modulation constellations; and transmits the indication information to the terminal device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity.

In addition, the network device can use less information to indicate a signature matrix and a modulation constellation that are used to receive the downlink data stream by the terminal device. Therefore, according to the method, a system network capacity can be effectively increased, and further, system overheads can be reduced.

The foregoing details the indication information transmission method in this embodiment of the present invention from a perspective of a network device with reference to FIG. 3 and FIG. 4. The following describes an indication information transmission method in an embodiment of the present invention from a perspective of a terminal device with reference to FIG. 5 and FIG. 6.

As shown in FIG. 5, an indication information transmission method 300 in this embodiment of the present invention may be executed, for example, by a terminal device in a communications system, and the terminal device is, for example, user equipment. As shown in FIG. 5, the method 300 includes the following steps:

S310. Receive indication information transmitted by a network device, where the indication information is used to indicate a first signature sequence and a first modulation constellation that are used to transmit a first downlink data stream by the network device, and one or more second signature sequences and one or more second modulation constellations that are used to transmit a second downlink data stream by the network device, where the second downlink data stream is one or more downlink data streams, other than the first downlink data stream, that are carried on a time-frequency resource used by the first downlink data stream, each signature sequence is a multi-dimensional complex-number vector including at least one zero element and at least one non-zero element, and the signature sequence is used to perform amplitude and phase adjustment on a modulation symbol obtained after the network device performs constellation mapping on a downlink data stream by using a modulation constellation.

S320. Determine the first signature sequence, the first modulation constellation, the one or more second signature sequences, and the one or more second modulation constellations according to the indication information.

S330. Decode, according to the first signature sequence, the first modulation constellation, the one or more second signature sequences, and the one or more second modulation constellations, the first downlink data stream transmitted by the network device.

Specifically, in a non-orthogonal multiple access system such as an LDS system, the network device allocates or specifies a signature sequence and a modulation constellation to or for one or more to-be-received downlink data streams of each terminal device. If the terminal device needs to appropriately receive or decode a downlink data stream that is transmitted by the network device to the terminal device, the terminal device not only needs to learn a signature sequence and a modulation constellation that are used to transmit the downlink data stream by the network device, but also needs to learn one or more signature sequences and one or more modulation constellations that are used to transmit another downlink data stream on a time-frequency resource used by the network device to transmit the downlink data stream.

Therefore, the network device may determine a first signature sequence and a first modulation constellation that are used to transmit a first downlink data stream to the terminal device, and determine one or more second signature sequences and one or more second modulation constellations that are used to transmit a second downlink data stream to another one or more terminal devices. The second downlink data stream is one or more downlink data streams, other than the first downlink data stream, that are carried on a time-frequency resource used by the first downlink data stream. In addition, the network may transmit the indication information to the terminal device. The indication information is used to indicate the first signature sequence, the first modulation constellation, the one or more second signature sequences, and the one or more second modulation constellations that are used to receive the first downlink data by the terminal device.

After receiving the indication information transmitted by the network device, the terminal device may determine, according to the indication information, the first signature sequence and the first modulation constellation that are used to transmit the first downlink data stream by the network device, and the one or more second signature sequences and the one or more second modulation constellations that are used to transmit another second downlink data stream on a same time-frequency resource that is used to transmit the first downlink data stream by the network device. In this way, the terminal device can receive or decode, according to the first signature sequence, the first modulation constellation, the one or more second signature sequences, and the one or more second modulation constellations, the first downlink data transmitted by the network device. Therefore, the network device and the terminal device exchange information, so that the terminal device can determine signature sequences and modulation constellations that are used by all downlink data streams carried on a same time-frequency resource. In this way, the network device and the terminal device can perform downlink data stream transmission based on the signature sequences and the modulation constellations, and can effectively increase a system network capacity.

Therefore, according to the indication information transmission method in this embodiment of the present invention, a terminal device receives indication information transmitted by a network device, and determines a first signature sequence and a first modulation constellation that are used to transmit a first downlink data stream to the terminal device by the network device, and one or more second signature sequences and one or more second modulation constella-tions that are used to transmit a second downlink data stream by the network device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity, including increasing a quantity of accessible users of a system, spectral efficiency, and the like.

In this embodiment of the present invention, in a non-orthogonal multiple access technology such as an LDS technology, a signature sequence is used to transmit multiple different data streams on a same resource unit. That is, the multiple different data streams reuse a same resource unit. Data streams may use different signature sequences, so that resource utilization is improved. The data streams may come from a same terminal device or from different terminal devices.

The signature sequence may be represented as a multi-dimensional complex-number vector. The complex-number vector may have two or more dimensions. The signature sequence may include at least one zero element and at least one non-zero element. Each dimension of the complex-number vector of the signature sequence may represent a resource unit. A corresponding element may be understood as an adjustment factor, and is used to perform amplitude and phase adjustment on a modulation symbol obtained after data of a data stream has undergone constellation mapping. For example, the adjustment method may be that the modulation symbol obtained after the data of the data stream has undergone constellation mapping is multiplied by the adjustment factor. The modulation symbol on which adjustment is performed by using multiple adjustment factors is transmitted on corresponding resource units, so that data is extensively transmitted on multiple resource units. The data may be binary bit data or multivariate data. The resource unit may be a resource unit in a time domain, a frequency domain, a space domain, a time-frequency domain, a time-space domain, or a time-frequency-space domain.

With reference to the foregoing descriptions, an encoding principle of the non-orthogonal multiple access technology may be exemplarily illustrated by using FIG. 2b. In the example shown in FIG. 2b, the signature sequence may be represented as:

$$\begin{pmatrix} s_1 \\ s_2 \\ s_3 \\ s_4 \end{pmatrix}.$$

There are four dimensions in a multi-dimensional complex-number vector represented by the signature sequence, representing four resource units. In addition, in the four elements of the signature sequence, there is at least one group of i and j, where $1 \le i \ne j \le 4$, so that $s_i = 0$ and $s_j \ne 0$. A modulation symbol obtained after data (b1, b2) of a data stream has undergone constellation mapping is q. After phase and amplitude adjustment is performed on q by using elements in the signature sequence, that is, adjustment factors, modulation symbols transmitted on resource units are obtained, where the modulation symbols are $q^*s_1$, $q^*s_2$, $q^*s_3$, and $q^*s_4$, respectively.

More generally, the signature sequence may be represented in the following form:

$$\begin{pmatrix} s_{1,m} \\ s_{2,m} \\ \vdots \\ s_{N,m} \end{pmatrix}, 1 \le m \le M,$$

where $s_{n,m}$ represents an element in the signature matrix; m and n are natural numbers; $1 \le n \le N, 1 \le m \le M$; N rows represent N resource units in an encoding unit; M represents a quantity of data streams reused in a group; $s_{n,m} = \alpha^* \exp(j^*\beta)$, $1 \le n \le N, 1 \le m \le M$; $\alpha$ and $\beta$ may be any real numbers; M and N are integers greater than 1; there is at least one group of i and j; and $1 \le i \ne j \le N$, so that $s_{i,m} = 0$ and $s_{j,m} \ne 0$.

In the non-orthogonal multiple access system, M signature sequences may constitute a signature matrix. The signature matrix may be, for example, in the following form:

$$\begin{pmatrix} s_{1,1} & s_{1,2} & \cdots & s_{1,M} \\ s_{2,1} & s_{2,2} & \cdots & s_{2,M} \\ \vdots & \vdots & \cdots & \vdots \\ s_{N,1} & s_{N,2} & \cdots & s_{N,M} \end{pmatrix}_{N \times M}.$$

Therefore, in this embodiment of the present invention, the signature matrix includes one or more signature sequences. The signature sequence is a multi-dimensional complex-number vector including at least one zero element and at least one non-zero element. The signature sequence is used to perform amplitude and phase adjustment on a modulation symbol that is obtained after the terminal device or the network device performs constellation mapping on a data stream by using a modulation constellation.

It should be further understood that, when this embodiment of the present invention is applied, it further needs to assume that the network device and the terminal device in the non-orthogonal multiple access system both store some or all of the following pre-designed content: (1) One or more signature matrices:

$$\begin{pmatrix} s_{1,1} & s_{1,2} & \cdots & s_{1,M} \\ s_{2,1} & s_{2,2} & \cdots & s_{2,M} \\ \vdots & \vdots & \cdots & \vdots \\ s_{N,1} & s_{N,2} & \cdots & s_{N,M} \end{pmatrix}_{N \times M},$$

where $s_{n,m} = \alpha^* \exp(j^*\beta), 1 \le n \le N, 1 \le m \le M$, $\alpha$ and $\beta$ may be any real numbers; M and N both are integers greater than 1; in addition, for each m, $1 \le m \le M$; there is at least one group of im and jm; and $1 \le im^* jm \le M$, so that $s_{i_m,m} = 0$ and $s_{j_m,m} \ne 0$; (2) One or more signature sequences:

$$\begin{pmatrix} s_{1,m} \\ s_{2,m} \\ \vdots \\ s_{N,m} \end{pmatrix},$$

where $1 \le m \le M$; and (3) One or more modulation constellations: $\{q_1, q_2, \ldots, q_{Q_m}\}$, where $Q_m \ge 2$, and each modulation constellation is corresponding to a modulation order.

Figure 6:
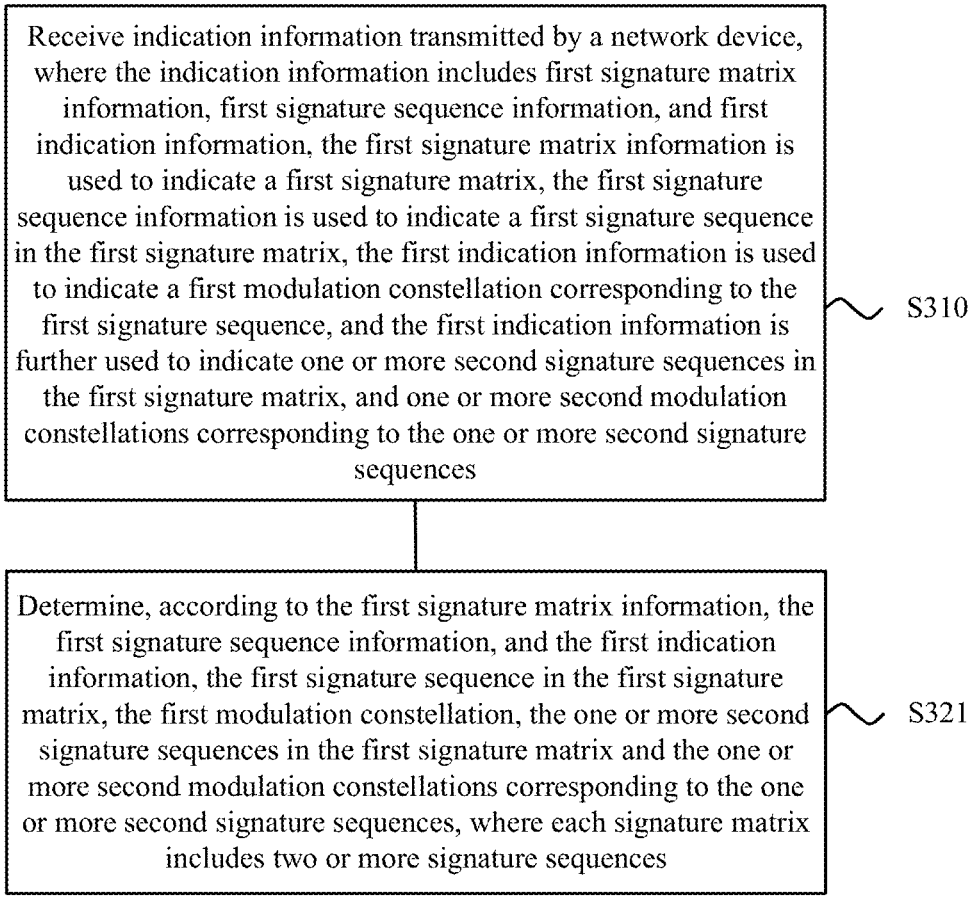
FIG. 6 is another schematic flowchart of an indication information transmission method according to another embodiment of the present invention.

With reference to FIG. 6, the following details the method 320 for determining the first signature sequence, the first modulation constellation, the one or more second signature sequences, and the one or more second modulation constellations according to this embodiment of the present invention.

As shown in FIG. 6, in this embodiment of the present invention, optionally, the indication information includes first signature matrix information, first signature sequence information, and first indication information. The first signature matrix information is used to indicate a first signature matrix. The first signature sequence information is used to indicate the first signature sequence in the first signature matrix. The first indication information is used to indicate the first modulation constellation corresponding to the first signature sequence. The first indication information is further used to indicate the one or more second signature sequences in the first signature matrix and the one or more second modulation constellations corresponding to the one or more second signature sequences.

The determining the first signature sequence, the first modulation constellation, the one or more second signature sequences, and the one or more second modulation constellations according to the indication information includes the following steps:

S321. Determine, according to the first signature matrix information, the first signature sequence information, and the first indication information, the first signature sequence in the first signature matrix, the first modulation constellation, the one or more second signature sequences in the first signature matrix and the one or more second modulation constellations corresponding to the one or more second signature sequences, where each signature matrix includes two or more signature sequences.

Specifically, in this embodiment of the present invention, the network device and the terminal device may store a signature matrix, a signature sequence, and a modulation constellation that are pre-designed. Alternatively, the network device and the terminal device may store a signature matrix and a modulation constellation that are pre-designed. A column of the signature matrix is a signature sequence. Therefore, in this embodiment of the present invention, storing the signature matrix also means storing a corresponding signature sequence.

In this embodiment of the present invention, the network device allocates the first signature sequence and the first modulation constellation that are used to transmit the first downlink data stream, and the one or more second signature sequences and the corresponding one or more second modulation constellations that are used to transmit the second downlink data stream, where the first signature sequence and the one or more signature sequences are in a same signature matrix. To indicate, to user equipment, the first signature sequence, the first modulation constellation, the one or more second signature sequences, and the one or more second modulation constellations, the network device determines the first signature matrix to which the first signature sequence and the one or more second signature sequences belong. In this way, the network device determines the indication information that is used to indicate the first signature sequence, the first modulation constellation, the one or more second signature sequences, and the one or more second modulation constellations. The indication information may include the first signature matrix information, the first signature sequence information, and the first indication information.

For example, the indication information may include three logical information segments. Logical information segment 1 may carry the first signature matrix information, used to indicate the first signature matrix that is used to transmit the first downlink data stream and the second downlink data stream by the network device. Logical information segment 2 may carry the first signature sequence information, used to indicate the first signature sequence that is in the first signature matrix and that is used to transmit the first downlink data stream by the network device. Logical information segment 3 may carry the first indication information, where the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences.

It should be understood that in this embodiment of the present invention, the logical information segments of the indication information may be consecutively or non-consecutively present in any sequential order in an instruction in which the indication information is located. This embodiment of the present invention sets no limit thereon.

Correspondingly, after receiving the instruction or a message carrying the indication information, the terminal device may learn, for example, according to logical information segment 1, which signature matrix is used by the network device to transmit the first downlink data stream and the second downlink data stream. The terminal device may learn, according to logical information segment 2, which signature sequence in the signature matrix indicated by logical information segment 1 is used by the network device to transmit the first downlink data stream. The terminal device may learn, according to logical information segment 3, which modulation order or which modulation constellation is used by the network device to transmit the first downlink data stream. In addition, the terminal device may further learn, according to logical information segment 3, which signature sequences in the signature matrix indicated by logical information segment 1 are used by the network device to transmit the second downlink data stream, and which modulation order or which modulation constellation is used by the network device to transmit the second downlink data stream.

In this way, the network device and the terminal device exchange information, so that the terminal device can determine signature sequences and modulation constellations that are used by all downlink data streams carried on a same time-frequency resource. Therefore, the network device and the terminal device can perform downlink data stream transmission based on the signature sequences and the modulation constellations, and can effectively increase a system network capacity, including increasing a quantity of accessible users of a system, spectral efficiency, and the like.

In this embodiment of the present invention, the network device may use multiple manners to indicate, to the terminal device, the first modulation constellation corresponding to the first signature sequence, and indicate, to the terminal device, the one or more second signature sequences in the first signature matrix and the one or more second modulation constellations that are corresponding to the one or more second signature sequences. The following provides descriptions separately.

Optionally, in this embodiment of the present invention, the first indication information includes: first modulation constellation information, second signature sequence information, and second modulation constellation information. The first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

Specifically, in this embodiment of the present invention, for example, logical information segment 3 carrying the first indication information may further include three logical information subsegments: logical information subsegment 1, logical information subsegment 2, and logical information subsegment 3. Logical information subsegment 1 may carry the first modulation constellation information, used to indicate the first modulation constellation corresponding to the first signature sequence. Logical information subsegment 2 may carry the second signature sequence information, used to indicate the one or more second signature sequences in the first signature matrix. Logical information subsegment 3 may carry the second modulation constellation information, used to indicate the one or more second modulation constellations corresponding to the one or more second signature sequences.

In this embodiment of the present invention, each modulation constellation may be corresponding to a modulation order. Therefore, logical information segment 3 may further indicate, in a manner of indicating a modulation order, a modulation constellation used to transmit a downlink data stream by the network device. Correspondingly, the terminal device may learn, according to logical information segment 3, the modulation order corresponding to the to-be-received downlink data stream, so as to determine the modulation constellation corresponding to the modulation order in a one-to-one manner, and receive the downlink data stream.

That is, in this embodiment of the present invention, optionally, the first indication information includes modulation order information of the first modulation constellation and modulation order information of the one or more second modulation constellations. Specifically, in this embodiment of the present invention, logical information subsegment 1 may include the modulation order information of the first modulation constellation, and logical information subsegment 3 may include the modulation order information of the one or more second modulation constellations.

It should be understood that, in this embodiment of the present invention, if the logical information segments indicate index values, the network device side and the terminal device side need to pre-establish consistent index relationships between related information, such as an index relationship between a signature matrix index value and a signature matrix, an index relationship between a signature sequence index value and a signature sequence in each signature matrix, and an index relationship between an modulation constellation index value and each modulation constellation, so that the network device and the terminal device can uniquely determine a corresponding signature matrix, signature sequence, and modulation constellation according to the index values indicated by the logical information segments and according to the pre-established related index relationships.

Optionally, in this embodiment of the present invention, the first indication information includes M groups of bit string information corresponding to signature sequences in the first signature matrix in a one-to-one manner. Each group of bit string information is used to indicate whether a corresponding signature sequence is the first signature sequence or the one or more second signature sequences. When a signature sequence corresponding to the group of bit string information is the first signature sequence or the one or more second signature sequences, the group of bit string information is further used to indicate the first modulation constellation or the one or more second modulation constellations corresponding to the corresponding signature sequence. M is a quantity of signature sequences included in the first signature matrix.

In this embodiment of the present invention, each modulation constellation may be corresponding to a modulation order. Therefore, the network device may further indicate, in a manner of indicating a modulation order, a modulation constellation used to receive a downlink data stream by the network device. Correspondingly, the terminal device may learn the modulation order corresponding to the to-be-received downlink data stream, so as to determine the modulation constellation corresponding to the modulation order in a one-to-one manner, and receive the downlink data stream.

That is, in this embodiment of the present invention, optionally, the first indication information includes modulation order information of the first modulation constellation and modulation order information of the one or more second modulation constellations.

It should be further understood that, in this embodiment of the present invention, the network device and the terminal device may use multiple methods to pre-store a signature matrix. A simple and direct method is storing all included zero elements and non-zero elements in a manner described above:

$$\begin{pmatrix} s_{1,1} & s_{1,2} & \cdots & s_{1,M} \\ s_{2,1} & s_{2,2} & \cdots & s_{2,M} \\ \vdots & \vdots & \cdots & \vdots \\ s_{N,1} & s_{N,2} & \cdots & s_{N,M} \end{pmatrix}_{N \times M}.$$

This embodiment of the present invention merely uses the example to describe storage of the signature matrix. However, it should be understood that this embodiment of the present invention is not limited thereto, and the network device and the terminal device may use another method to pre-store the signature matrix.

It should be further understood that this embodiment of the present invention merely uses the foregoing solution as an example for description. However, the present embodiments are not limited thereto. For example, when signature sequences that are used to transmit uplink data by the terminal device and that are determined by the network device all belong to a same signature matrix or when a same signature matrix is used by default, the indication information may include only the first signature sequence information and the first indication information. For another example, when signature sequences that are used to transmit uplink data by the terminal device and that are determined by the network device all are signature sequences with fixed serial numbers by default, the indication information may include only the first signature matrix information and the first indication information. For another example, when modulation constellations that are used to transmit uplink data by the terminal device and that are determined by the network device all are fixed modulation constellations by default, the indication information may include only the first signature matrix information, the first signature sequence information, and the second signature sequence information.

In this way, the network device may use less information to indicate the signature matrix and the modulation constellation that are used to receive the downlink data stream by the terminal device. Therefore, according to the method, a system network capacity can be effectively increased, and further, system overheads can be reduced.

It should be understood that the present disclosure merely uses the embodiment shown in FIG. 6 as an example for description. However, the present embodiments are not limited thereto, and another method may be used to indicate, to the terminal device, a signature sequence and a modulation constellation that are allocated or specified by the network device.

Therefore, according to the indication information transmission method in this embodiment of the present invention, a terminal device receives indication information transmitted by a network device, and determines a first signature sequence and a first modulation constellation that are used to transmit a first downlink data stream to the terminal device by the network device, and one or more second signature sequences and one or more second modulation constellations that are used to transmit a second downlink data stream by the network device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity, including increasing a quantity of accessible users of a system, spectral efficiency, and the like.

In addition, according to the method, less information can be used to indicate a signature matrix and a modulation constellation that are used to receive the downlink data stream by the terminal device. Therefore, according to the method, a system network capacity can be effectively increased, and further, system overheads can be reduced.

Optionally, in this embodiment of the present invention, the receiving indication information transmitted by a network device includes: receiving, from the network device, a downlink scheduling message, dedicated higher-layer control signaling, or a system broadcast message. The downlink scheduling message, the dedicated higher-layer control signaling, and the system broadcast message include the indication information.

Optionally, in this embodiment of the present invention, the dedicated higher-layer control signaling includes a RRC connection setup message and an RRC connection reconfiguration message.

In this embodiment of the present invention, the terminal device may receive the indication information that is transmitted by the network device in at least one of a bit string manner or a tabular manner. Optionally, the indication information is bit string information.

In this embodiment of the present invention, optionally, the signature sequence is a LDS sequence. Further, optionally, a quantity of zero elements included in the signature sequence is greater than or equal to a quantity of non-zero elements.

It should be understood that, the network device and the terminal device exchange information, and related characteristics and functions that are described from the perspective of the network device side are corresponding to related characteristics and functions that are described from the perspective of the terminal device side. For brevity, details are not described herein again.

It should be further understood that serial numbers of the foregoing processes do not denote an execution sequence in the embodiments of the present invention. The execution sequence of the processes should be determined according to functions and internal logic of the processes, and should not be construed as any limitation on the implementation processes of the embodiments of the present invention.

Therefore, according to the indication information transmission method in this embodiment of the present invention, a terminal device receives indication information transmitted by a network device, and determines a first signature sequence and a first modulation constellation that are used to transmit a first downlink data stream to the terminal device by the network device, and one or more second signature sequences and one or more second modulation constellations that are used to transmit a second downlink data stream by the network device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity, including increasing a quantity of accessible users of a system, spectral efficiency, and the like.

In addition, according to the method, less information can be used to indicate a signature matrix and a modulation constellation that are used to receive the downlink data stream by the terminal device. Therefore, according to the method, a system network capacity can be effectively increased, and further, system overheads can be reduced.

The foregoing details the indication information transmission method according to the embodiments of the present invention with reference to FIG. 3 to FIG. 6. The following describes an indication information transmission apparatus according to an embodiment of the present invention with reference to FIG. 7 to FIG. 11.

Figure 7:
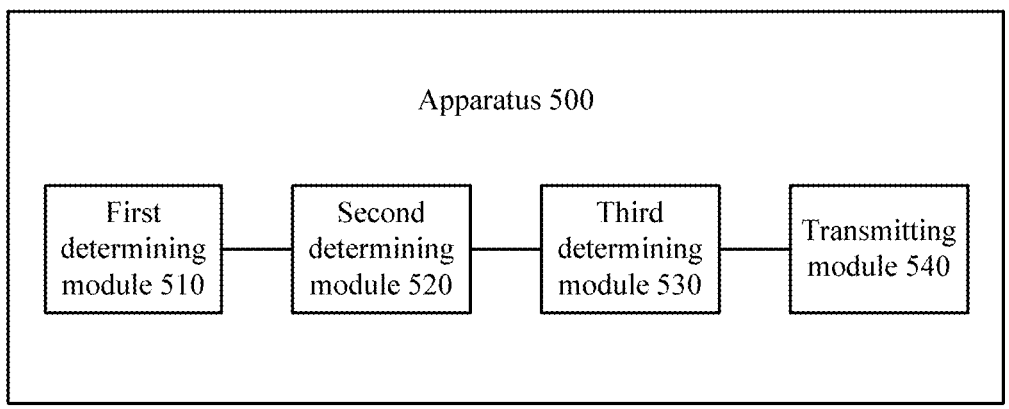
FIG. 7 is a schematic block diagram of an indication information transmission apparatus according to an embodiment of the present invention.

FIG. 7 shows an indication information transmission apparatus 500 according to this embodiment of the present invention. As shown in FIG. 7, the apparatus 500 includes: a first determining module 510, configured to determine a first signature sequence and a first modulation constellation that are used to transmit a first downlink data stream to a terminal device, where each signature sequence is a multi-dimensional complex-number vector including at least one zero element and at least one non-zero element, and the signature sequence is used to perform amplitude and phase adjustment on a modulation symbol obtained after a network device performs constellation mapping on a downlink data stream by using a modulation constellation; a second determining module 520, configured to determine one or more second signature sequences and one or more second modulation constellations that are used to transmit a second downlink data stream, where the second downlink data stream is one or more downlink data streams, other than the first downlink data stream, that are carried on a time-frequency resource used by the first downlink data stream; a third determining module 530, configured to determine indication information indicating the first signature sequence and the first modulation constellation that are determined by the first determining module 510, and configured to determine indication information indicating the one or more second signature sequences and the one or more second modulation constellations that are determined by the second determining module 520; and a transmitting module 540, configured to transmit, to the terminal device, the indication information determined by the third determining module 530.

Therefore, according to the indication information transmission apparatus in this embodiment of the present invention, a network device determines a first signature sequence and a first modulation constellation that are used to transmit a first downlink data stream to a terminal device; determines one or more second signature sequences and one or more second modulation constellations that are used to transmit a second downlink data stream by the network device; determines indication information that is used to indicate the first signature sequence, the first modulation constellation, the one or more second signature sequences, and the one or more second modulation constellations; and transmits the indication information to the terminal device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity.

Figure 8:
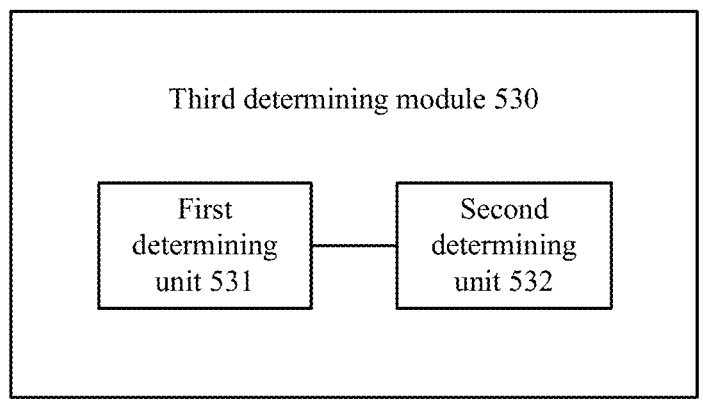
FIG. 8 is a schematic block diagram of a third determining module of an apparatus according to an embodiment of the present invention.

In this embodiment of the present invention, optionally, as shown in FIG. 8, the third determining module 530 includes: a first determining unit 531, configured to determine that the first signature sequence and the one or more second signature sequences belong to a first signature matrix, where each signature matrix includes two or more signature sequences; and a second determining unit 532, configured to determine that the indication information includes first signature matrix information, first signature sequence information, and first indication information, where the first signature matrix information is used to indicate the first signature matrix, the first signature sequence information is used to indicate the first signature sequence in the first signature matrix, the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences.

In this embodiment of the present invention, optionally, the first indication information determined by the second determining unit 532 includes: first modulation constellation information, second signature sequence information, and second modulation constellation information. The first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

In this embodiment of the present invention, optionally, the first indication information determined by the second determining unit 532 includes M groups of bit string information corresponding to signature sequences in the first signature matrix in a one-to-one manner. Each group of bit string information is used to indicate whether a corresponding signature sequence is the first signature sequence or the one or more second signature sequences. When a signature sequence corresponding to the group of bit string information is the first signature sequence or the one or more second signature sequences, the group of bit string information is further used to indicate the first modulation constellation or the one or more second modulation constellations corresponding to the corresponding signature sequence. M is a quantity of signature sequences included in the first signature matrix.

In this embodiment of the present invention, optionally, the first indication information determined by the second determining unit 532 includes modulation order information of the first modulation constellation and modulation order information of the one or more second modulation constellations.

In this embodiment of the present invention, optionally, the transmitting module 540 is specifically configured to transmit, to the terminal device, a downlink scheduling message, dedicated higher-layer control signaling, or a system broadcast message. The downlink scheduling message, the dedicated higher-layer control signaling, and the system broadcast message include the indication information.

In this embodiment of the present invention, optionally, the dedicated higher-layer control signaling includes a RRC connection setup message and an RRC connection reconfiguration message.

In this embodiment of the present invention, optionally, the indication information determined by the third determining module 530 is bit string information.

In this embodiment of the present invention, optionally, the signature sequence is a LDS sequence.

In this embodiment of the present invention, optionally, a quantity of zero elements included in the signature sequence is greater than or equal to a quantity of non-zero elements.

In this embodiment of the present invention, optionally, the apparatus 500 is a network device.

It should be understood that the apparatus 500 in this embodiment of the present invention may be corresponding to the network device in the method embodiment of the present invention. In addition, the foregoing and other operations and/or functions of the modules in the apparatus 500 are separately intended to implement corresponding processes of the methods 200 in FIG. 3 and FIG. 4. For brevity, details are not described herein again.

Therefore, according to the indication information transmission apparatus in this embodiment of the present invention, a network device determines a first signature sequence and a first modulation constellation that are used to transmit a first downlink data stream to a terminal device; determines one or more second signature sequences and one or more second modulation constellations that are used to transmit a second downlink data stream by the network device; determines indication information that is used to indicate the first signature sequence, the first modulation constellation, the one or more second signature sequences, and the one or more second modulation constellations; and transmits the indication information to the terminal device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity.

In addition, the apparatus in this embodiment of the present invention can use less information to indicate a signature matrix and a modulation constellation that are used to receive the downlink data stream by the terminal device. Therefore, the apparatus can effectively increase a system network capacity, and can further reduce system overheads.

The foregoing details the indication information transmission apparatus in this embodiment of the present invention from a perspective of a network device side with reference to FIG. 7 to FIG. 8. The following details an indication information transmission apparatus in an embodiment of the present invention from a perspective of a terminal device side with reference to FIG. 9.

Figure 9:
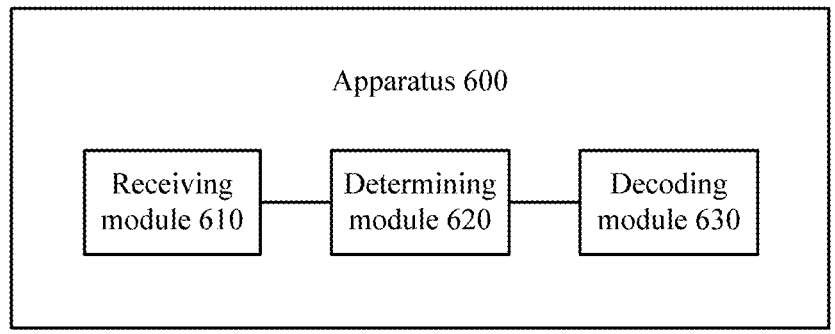
FIG. 9 is a schematic block diagram of an indication information transmission apparatus according to another embodiment of the present invention.

FIG. 9 shows an indication information transmission apparatus 600 according to this embodiment of the present invention. As shown in FIG. 9, the apparatus 600 includes: a receiving module 610, configured to receive indication information transmitted by a network device, where the indication information is used to indicate a first signature sequence and a first modulation constellation that are used to transmit a first downlink data stream by the network device, and one or more second signature sequences and one or more second modulation constellations that are used to transmit a second downlink data stream by the network device, where the second downlink data stream is one or more downlink data streams, other than the first downlink data stream, that are carried on a time-frequency resource used by the first downlink data stream, each signature sequence is a multi-dimensional complex-number vector including at least one zero element and at least one non-zero element, and the signature sequence is used to perform amplitude and phase adjustment on a modulation symbol obtained after the network device performs constellation mapping on a downlink data stream by using a modulation constellation; a determining module 620, configured to determine the first signature sequence, the first modulation constellation, the one or more second signature sequences, and the one or more second modulation constellations according to the indication information received by the receiving module 610; and a decoding module 630, configured to decode, according to the first signature sequence, the first modulation constellation, the one or more second signature sequences, and the one or more second modulation constellations that are determined by the determining module 620, the first downlink data stream transmitted by the network device.

Therefore, according to the indication information transmission apparatus in this embodiment of the present invention, a terminal device receives indication information transmitted by a network device, and determines a first signature sequence and a first modulation constellation that are used to transmit a first downlink data stream to the terminal device by the network device, and one or more second signature sequences and one or more second modulation constellations that are used to transmit a second downlink data stream by the network device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity, including increasing a quantity of accessible users of a system, spectral efficiency, and the like.

In this embodiment of the present invention, optionally, the indication information received by the receiving module 610 includes first signature matrix information, first signature sequence information, and first indication information. The first signature matrix information is used to indicate a first signature matrix, the first signature sequence information is used to indicate the first signature sequence in the first signature matrix, the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences.

The determining module 620 is specifically configured to determine, according to the first signature matrix information, the first signature sequence information, and the first indication information, the first signature sequence in the first signature matrix, the first modulation constellation, the one or more second signature sequences in the first signature matrix and the one or more second modulation constellations corresponding to the one or more second signature sequences. Each signature matrix includes two or more signature sequences.

In this embodiment of the present invention, optionally, the first indication information received by the receiving module bio includes: first modulation constellation information, second signature sequence information, and second modulation constellation information. The first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

In this embodiment of the present invention, optionally, the first indication information received by the receiving module bio includes M groups of bit string information corresponding to signature sequences in the first signature matrix in a one-to-one manner. Each group of bit string information is used to indicate whether a corresponding signature sequence is the first signature sequence or the one or more second signature sequences. When a signature sequence corresponding to the group of bit string information is the first signature sequence or the one or more second signature sequences, the group of bit string information is further used to indicate the first modulation constellation or the one or more second modulation constellations corresponding to the corresponding signature sequence. M is a quantity of signature sequences included in the first signature matrix.

In this embodiment of the present invention, optionally, the first indication information received by the receiving module 610 includes modulation order information of the first modulation constellation and modulation order information of the one or more second modulation constellations.

In this embodiment of the present invention, optionally, the receiving module bio is specifically configured to receive, from the network device, a downlink scheduling message, dedicated higher-layer control signaling, or a system broadcast message. The downlink scheduling message, the dedicated higher-layer control signaling, and the system broadcast message include the indication information.

In this embodiment of the present invention, optionally, the dedicated higher-layer control signaling includes a RRC connection setup message and an RRC connection reconfiguration message.

In this embodiment of the present invention, optionally, the indication information received by the receiving module 610 is bit string information.

In this embodiment of the present invention, optionally, the signature sequence is a LDS sequence.

In this embodiment of the present invention, optionally, a quantity of zero elements included in the signature sequence is greater than or equal to a quantity of non-zero elements.

In this embodiment of the present invention, optionally, the apparatus 600 is a terminal device.

It should be understood that the indication information transmission apparatus 600 in this embodiment of the present invention may be corresponding to the terminal device in the method embodiment of the present invention. In addition, the foregoing and other operations and/or functions of the modules in the apparatus 600 are separately intended to implement corresponding processes of the methods 300 in FIG. 5 and FIG. 6. For brevity, details are not described herein again.

Therefore, according to the indication information transmission apparatus in this embodiment of the present invention, a terminal device receives indication information transmitted by a network device, and determines a first signature sequence and a first modulation constellation that are used to transmit a first downlink data stream to the terminal device by the network device, and one or more second signature sequences and one or more second modulation constellations that are used to transmit a second downlink data stream by the network device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity, including increasing a quantity of accessible users of a system, spectral efficiency, and the like.

In addition, the apparatus in this embodiment of the present invention can use less information to indicate a signature matrix and a modulation constellation that are used to receive the downlink data stream by the terminal device. Therefore, the apparatus can effectively increase a system network capacity, and can further reduce system overheads.

Figure 10:
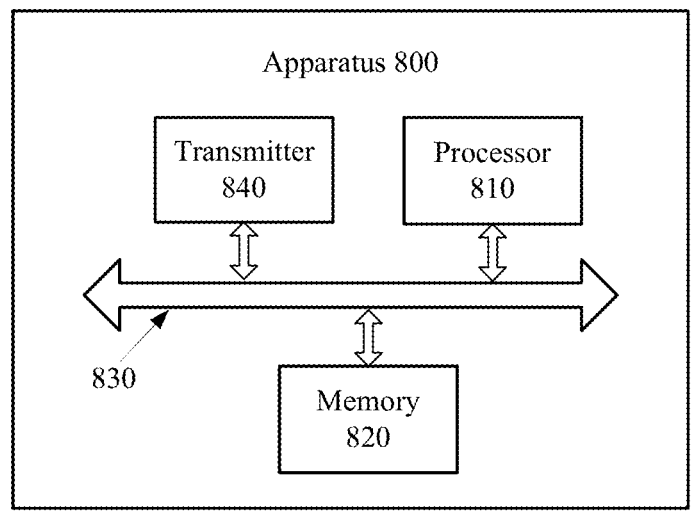
FIG. 10 is a schematic block diagram of an indication information transmission apparatus according to still another embodiment of the present invention.

As shown in FIG. 10, an embodiment of the present invention further provides an indication information transmission apparatus 800. The apparatus 800 includes a processor 810, a memory 820, a bus system 830, and a transmitter 840. The processor 810, the memory 820, and the transmitter 840 are connected by using the bus system 830. The memory 820 is configured to store an instruction. The processor 810 is configured to execute the instruction stored in the memory 820, to control the transmitter 840 to transmit a signal.

The processor 810 is configured to: determine a first signature sequence and a first modulation constellation that are used to transmit a first downlink data stream to a terminal device, where each signature sequence is a multi-dimensional complex-number vector including at least one zero element and at least one non-zero element, and the signature sequence is used to perform amplitude and phase adjustment on a modulation symbol obtained after a network device performs constellation mapping on a downlink data stream by using a modulation constellation; determine one or more second signature sequences and one or more second modulation constellations that are used to transmit a second downlink data stream, where the second downlink data stream is one or more downlink data streams, other than the first downlink data stream, that are carried on a time-frequency resource used by the first downlink data stream; and determine indication information that is used to indicate the first signature sequence, the first modulation constellation, the one or more second signature sequences, and the one or more second modulation constellations.

The transmitter 840 is configured to transmit the indication information to the terminal device.

Therefore, according to the indication information transmission apparatus in this embodiment of the present invention, a network device determines a first signature sequence and a first modulation constellation that are used to transmit a first downlink data stream to a terminal device; determines one or more second signature sequences and one or more second modulation constellations that are used to transmit a second downlink data stream by the network device; determines indication information that is used to indicate the first signature sequence, the first modulation constellation, the one or more second signature sequences, and the one or more second modulation constellations; and transmits the indication information to the terminal device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity.

It should be understood that, in this embodiment of the present invention, the processor 810 may be a central processing unit (CPU), or the processor Bio may be another general-purpose processor, a digital signal processor (DSP), an application-specific integrated circuit (ASIC), a field programmable gate array (FPGA) or another programmable logic device, a discrete gate or transistor logical device, a discrete hardware assembly, or the like. The general-purpose processor may be a microprocessor, or the processor may be any conventional processor or the like.

The memory 820 may include a read-only memory and a random access memory, and provide instructions and data for the processor 810. A part of the memory 820 may further include a non-volatile random access memory. For example, the memory 820 may further store device type information.

The bus system 830 may further include a power supply bus, a control bus, a status signal bus, and the like, in addition to a data bus. However, for clear description, various buses are marked as the bus system 830 in the figure.

In an implementation process, steps of the foregoing methods may be implemented by using an integrated logic circuit of hardware in the processor Bio or by using an instruction in a form of software. The steps of the methods disclosed with reference to the embodiments of the present invention may be directly implemented by using a hardware processor, or may be implemented by using a combination of hardware and a software module in a processor. The software module may be located in a mature storage medium in the art, such as a random access memory, a flash memory, a read-only memory, a programmable read-only memory, an electrically-erasable programmable memory, or a register. The storage medium is located in the memory 820, and the processor 810 reads information from the memory 820 and implements the steps of the foregoing methods in combination with hardware of the processor 810. To avoid repetition, no details are described herein.

Optionally, in an embodiment, that the processor 810 determines the indication information that is used to indicate the first signature sequence, the first modulation constellation, the one or more second signature sequences, and the one or more second modulation constellations includes: determining that the first signature sequence and the one or more second signature sequences belong to a first signature matrix, where each signature matrix includes two or more signature sequences; and determining that the indication information includes first signature matrix information, first signature sequence information, and first indication information, where the first signature matrix information is used to indicate the first signature matrix, the first signature sequence information is used to indicate the first signature sequence in the first signature matrix, the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences.

Optionally, in an embodiment, the first indication information determined by the processor 810 includes: first modulation constellation information, second signature sequence information, and second modulation constellation information. The first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

Optionally, in an embodiment, the first indication information determined by the processor 810 includes M groups of bit string information corresponding to signature sequences in the first signature matrix in a one-to-one manner. Each group of bit string information is used to indicate whether a corresponding signature sequence is the first signature sequence or the one or more second signature sequences. When a signature sequence corresponding to the group of bit string information is the first signature sequence or the one or more second signature sequences, the group of bit string information is further used to indicate the first modulation constellation or the one or more second modulation constellations corresponding to the corresponding signature sequence. M is a quantity of signature sequences included in the first signature matrix.

Optionally, in an embodiment, the first indication information determined by the processor 810 includes modulation order information of the first modulation constellation and modulation order information of the one or more second modulation constellations.

Optionally, in an embodiment, that the transmitter 840 transmits the indication information to the terminal device includes: transmitting, to the terminal device, a downlink scheduling message, dedicated higher-layer control signaling, or a system broadcast message, where the downlink scheduling message, the dedicated higher-layer control signaling, and the system broadcast message include the indication information.

Optionally, in an embodiment, the dedicated higher-layer control signaling includes a RRC connection setup message and an RRC connection reconfiguration message.

Optionally, in an embodiment, the indication information determined by the processor 810 is bit string information.

Optionally, in an embodiment, the signature sequence is a LDS sequence.

Optionally, in an embodiment, a quantity of zero elements included in the signature sequence is greater than or equal to a quantity of non-zero elements.

Optionally, in an embodiment, the apparatus 800 is a network device.

It should be understood that the indication information transmission apparatus 800 in this embodiment of the present invention may be corresponding to the network device and the apparatus 500 in this embodiment of the present invention, and may be corresponding to a corresponding body for executing the method of the embodiments of the present invention. In addition, the foregoing and other operations and/or functions of the modules in the apparatus 800 are separately intended to implement corresponding processes of the methods in FIG. 3 and FIG. 4. For brevity, details are not described herein again.

Therefore, according to the indication information transmission apparatus in this embodiment of the present invention, a network device determines a first signature sequence and a first modulation constellation that are used to transmit a first downlink data stream to a terminal device; determines one or more second signature sequences and one or more second modulation constellations that are used to transmit a second downlink data stream by the network device; determines indication information that is used to indicate the first signature sequence, the first modulation constellation, the one or more second signature sequences, and the one or more second modulation constellations; and transmits the indication information to the terminal device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity.

In addition, the apparatus in this embodiment of the present invention can use less information to indicate a signature matrix and a modulation constellation that are used to receive the downlink data stream by the terminal device. Therefore, the apparatus can effectively increase a system network capacity, and can further reduce system overheads.

Figure 11:
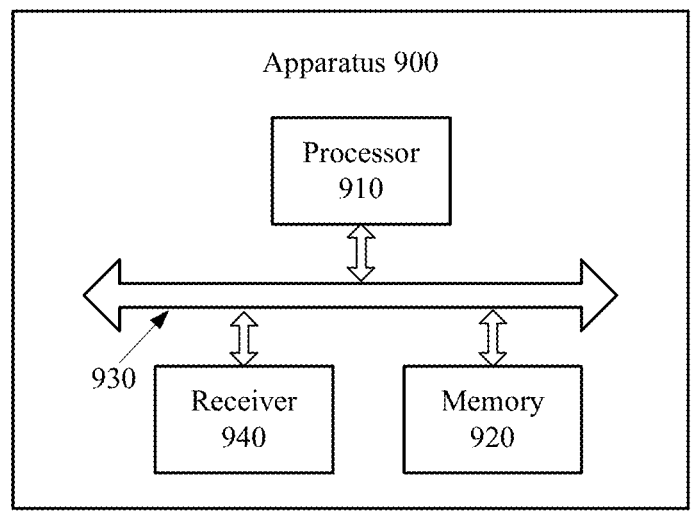
FIG. 11 is a schematic block diagram of an indication information transmission apparatus according to yet another embodiment of the present invention.

As shown in FIG. 11, an embodiment of the present invention further provides an indication information transmission apparatus 900. The apparatus 900 includes a processor 910, a memory 920, a bus system 930, and a receiver 940. The processor 910, the memory 920, and the receiver 940 are connected by using the bus system 930. The memory 920 is configured to store an instruction. The processor 910 is configured to execute the instruction stored in the memory 920, to control the receiver 940 to receive a signal.

The receiver 940 is configured to receive indication information transmitted by a network device. The indication information is used to indicate a first signature sequence and a first modulation constellation that are used to transmit a first downlink data stream by the network device, and one or more second signature sequences and one or more second modulation constellations that are used to transmit a second downlink data stream by the network device. The second downlink data stream is one or more downlink data streams, other than the first downlink data stream, that are carried on a time-frequency resource used by the first downlink data stream. Each signature sequence is a multi-dimensional complex-number vector including at least one zero element and at least one non-zero element. The signature sequence is used to perform amplitude and phase adjustment on a modulation symbol obtained after the network device performs constellation mapping on a downlink data stream by using a modulation constellation.

The processor 910 is configured to: determine the first signature sequence, the first modulation constellation, the one or more second signature sequences, and the one or more second modulation constellations according to the indication information; and decode, according to the first signature sequence, the first modulation constellation, the one or more second signature sequences, and the one or more second modulation constellations, the first downlink data stream transmitted by the network device.

Therefore, according to the indication information transmission apparatus in this embodiment of the present invention, a terminal device receives indication information transmitted by a network device, and determines a first signature sequence and a first modulation constellation that are used to transmit a first downlink data stream to the terminal device by the network device, and one or more second signature sequences and one or more second modulation constellations that are used to transmit a second downlink data stream by the network device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity, including increasing a quantity of accessible users of a system, spectral efficiency, and the like.

It should be understood that, in this embodiment of the present invention, the processor 910 may be a central processing unit (CPU), or the processor 910 may be another general-purpose processor, a digital signal processor (DSP), an application-specific integrated circuit (ASIC), a field programmable gate array (FPGA) or another programmable logic device, a discrete gate or transistor logical device, a discrete hardware assembly, or the like. The general-purpose processor may be a microprocessor, or the processor may be any conventional processor or the like.

The memory 920 may include a read-only memory and a random access memory, and provide instructions and data for the processor 910. A part of the memory 920 may further include a non-volatile random access memory. For example, the memory 920 may further store device type information.

The bus system 930 may further include a power supply bus, a control bus, a status signal bus, and the like, in addition to a data bus. However, for clear description, various buses are marked as the bus system 930 in the figure.

In an implementation process, steps of the foregoing methods may be implemented by using an integrated logic circuit of hardware in the processor 910 or by using an instruction in a form of software. The steps of the methods disclosed with reference to the embodiments of the present invention may be directly implemented by using a hardware processor, or may be implemented by using a combination of hardware and a software module in a processor. The software module may be located in a mature storage medium in the art, such as a random access memory, a flash memory, a read-only memory, a programmable read-only memory, an electrically-erasable programmable memory, or a register. The storage medium is located in the memory 920, and the processor 910 reads information from the memory 920 and implements the steps of the foregoing methods in combination with hardware of the processor 910. To avoid repetition, no details are described herein.

Optionally, in an embodiment, the indication information received by the receiver 940 includes first signature matrix information, first signature sequence information, and first indication information. The first signature matrix information is used to indicate a first signature matrix, the first signature sequence information is used to indicate the first signature sequence in the first signature matrix, the first indication information is used to indicate the first modulation constellation corresponding to the first signature sequence, and the first indication information is further used to indicate the one or more second signature sequences in the first signature matrix and the one or more second modulation constellations corresponding to the one or more second signature sequences.

That the processor 910 determines the first signature sequence, the first modulation constellation, the one or more second signature sequences, and the one or more second modulation constellations according to the indication information includes: determining, according to the first signature matrix information, the first signature sequence information, and the first indication information, the first signature sequence in the first signature matrix, the first modulation constellation, the one or more second signature sequences in the first signature matrix and the one or more second modulation constellations corresponding to the one or more second signature sequences, where each signature matrix includes two or more signature sequences.

Optionally, in an embodiment, the first indication information received by the receiver 940 includes: first modulation constellation information, second signature sequence information, and second modulation constellation information. The first modulation constellation information is used to indicate the first modulation constellation corresponding to the first signature sequence, the second signature sequence information is used to indicate the one or more second signature sequences in the first signature matrix, and the second modulation constellation information is used to indicate the one or more second modulation constellations corresponding to the one or more second signature sequences.

Optionally, in an embodiment, the first indication information received by the receiver 940 includes M groups of bit string information corresponding to signature sequences in the first signature matrix in a one-to-one manner. Each group of bit string information is used to indicate whether a corresponding signature sequence is the first signature sequence or the one or more second signature sequences. When a signature sequence corresponding to the group of bit string information is the first signature sequence or the one or more second signature sequences, the group of bit string information is further used to indicate the first modulation constellation or the one or more second modulation constellations corresponding to the corresponding signature sequence. M is a quantity of signature sequences included in the first signature matrix.

Optionally, in an embodiment, the first indication information received by the receiver 940 includes modulation order information of the first modulation constellation and modulation order information of the one or more second modulation constellations.

Optionally, in an embodiment, that the receiver 940 receives the indication information transmitted by the network device includes: receiving, from the network device, a downlink scheduling message, dedicated higher-layer control signaling, or a system broadcast message, where the downlink scheduling message, the dedicated higher-layer control signaling, and the system broadcast message include the indication information.

Optionally, in an embodiment, the dedicated higher-layer control signaling includes a RRC connection setup message and an RRC connection reconfiguration message.

Optionally, in an embodiment, the indication information received by the receiver 940 is bit string information.

Optionally, in an embodiment, the signature sequence is a LDS sequence.

Optionally, in an embodiment, a quantity of zero elements included in the signature sequence is greater than or equal to a quantity of non-zero elements.

Optionally, in an embodiment, the apparatus 900 is a terminal device.

It should be understood that the indication information transmission apparatus 900 in this embodiment of the present invention may be corresponding to the terminal device and the apparatus 600 in this embodiment of the present invention, and may be corresponding to a corresponding body for executing the method of the embodiments of the present invention. In addition, the foregoing and other operations and/or functions of the modules in the apparatus 900 are separately intended to implement corresponding processes of the methods in FIG. 5 and FIG. 6. For brevity, details are not described herein again.

Therefore, according to the indication information transmission apparatus in this embodiment of the present invention, a terminal device receives indication information transmitted by a network device, and determines a first signature sequence and a first modulation constellation that are used to transmit a first downlink data stream to the terminal device by the network device, and one or more second signature sequences and one or more second modulation constellations that are used to transmit a second downlink data stream by the network device, so that the terminal device can determine signature sequences and modulation constellations that are used by all downlink data streams carried on a same time-frequency resource, and can decode, according to the information, the first downlink data stream that is transmitted by the network device to the terminal device. In this way, the network device and the terminal device can perform downlink data stream transmission based on a non-orthogonal multiple access technology, and can effectively increase a system network capacity, including increasing a quantity of accessible users of a system, spectral efficiency, and the like.

In addition, the apparatus in this embodiment of the present invention can use less information to indicate a signature matrix and a modulation constellation that are used to receive the downlink data stream by the terminal device. Therefore, the apparatus can effectively increase a system network capacity, and can further reduce system overheads.

It should be understood that the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should be further understood that determining B according to A does not mean that B is determined according to A only; that is, B may also be determined according to A and/or other information.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or another network such as the Internet interacting with other systems by using the signal).

In addition, aspects or features of the present embodiments may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a CD (Compact Disk), a DVD (Digital Versatile Disk), a smart card and a flash memory component (for example, EPROM (Erasable Programmable Read-Only Memory), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be indirect couplings or communication connections between some interfaces, apparatuses, or units, or may be implemented in electronic, mechanical, or other forms.

The units described as separate parts may or may not be physically separate. Parts displayed as units may or may not be physical units, may be located in one position, or may be distributed on multiple network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present embodiments essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

The descriptions described above are merely specific embodiments of the present invention, but are not intended to limit the protection scope of the present embodiments. Any modification or replacement readily figured out by a person skilled in the art within the technical scope disclosed in the present embodiments shall fall within the protection scope of the present embodiments. Therefore, the protection scope of the present invention shall be subject to the protection scope of the claims.

What is claimed is:

1. A network device, comprising:
a processor; and
a non-transitory computer readable storage medium storing a program for execution by the processor, the program including instructions to:
determine a first signature sequence and a first modulation constellation for transmitting a first downlink data stream to a terminal device;
generate a first signal by performing amplitude and phase adjustment, using the first signature sequence, on a modulation symbol obtained after performing constellation mapping on the first downlink data stream using the first modulation constellation;
determine one or more second signature sequences and one or more second modulation constellations for transmitting a second downlink data stream, wherein the second downlink data stream is one or more downlink data streams other than the first downlink data stream, that are carried on a time-frequency resource used by the first downlink data stream, wherein the first signature sequence and the one or more second signature sequence are multi-dimensional complex-number vectors comprising at least one zero element and at least one non-zero element;
determine indication information indicating the first signature sequence, the first modulation constellation, the one or more second signature sequences, and the one or more second modulation constellations;
transmit the indication information to the terminal device in a second signal separate from the first signal; and
transmit the first signal to the terminal device, wherein transmitting the first signal and the second signal to the terminal device causes the terminal device to determine the first signature sequence, the first modulation constellation, the one or more second signature sequences, and the one or more second modulation constellations from the received second signal and to decode the first signal according to the according to the first signature sequence, the first modulation constellation, the one or more second signature sequences, and the one or more second modulation constellations.

2. The network device according to claim 1, wherein the instructions to determine the indication information comprises instructions to:
determine that the first signature sequence and the one or more second signature sequences belong to a first signature matrix, wherein the first signature matrix comprises two or more signature sequences; and
determine that the indication information comprises first signature matrix information, first signature sequence information, and first indication information, wherein the first signature matrix information indicates the first signature matrix, wherein the first signature sequence information indicates the first signature sequence in the first signature matrix, wherein the first indication information indicates the first modulation constellation corresponding to the first signature sequence, and wherein the first indication information further indicates the one or more second signature sequences in the first signature matrix and the one or more second modulation constellations corresponding to the one or more second signature sequences.

3. The network device according to claim 2, wherein the first indication information comprises first modulation constellation information, second signature sequence information, and second modulation constellation information, wherein the first modulation constellation information indicates the first modulation constellation corresponding to the first signature sequence, wherein the second signature sequence information indicates the one or more second signature sequences in the first signature matrix, and wherein the second modulation constellation information indicates the one or more second modulation constellations corresponding to the one or more second signature sequences.

4. The network device according to claim 2, wherein the first indication information comprises M groups of bit string information corresponding to signature sequences in the first signature matrix in a one-to-one manner, wherein the M groups of bit string information indicate whether a corresponding signature sequence is the first signature sequence or the one or more second signature sequences.

5. The network device according to claim 4, wherein the M groups of bit string information indicate the first modulation constellation or the one or more second modulation constellations corresponding to the corresponding signature sequence, wherein M is a quantity of signature sequences comprised in the first signature matrix.

6. The network device according to claim 4, wherein the first indication information comprises modulation order information of the first modulation constellation and modulation order information of the one or more second modulation constellations.

7. The network device according to claim 1, wherein the instructions to transmit the indication information to the terminal device comprises instructions to:
transmit, to the terminal device, a downlink scheduling message, dedicated higher-layer control signaling, or a system broadcast message, wherein the downlink scheduling message, the dedicated higher-layer control signaling, or the system broadcast message comprise the indication information.

8. The network device according to claim 7, wherein the dedicated higher-layer control signaling comprises a radio resource control (RRC) connection setup message and an RRC connection reconfiguration message.

9. The network device according to claim 1, wherein the indication information is bit string information.

10. The network device according to claim 1, wherein the first signature sequence is a low-density signature (LDS) sequence.

11. The network device according to claim 10, wherein a quantity of zero elements comprised in the first signature sequence is greater than or equal to a quantity of non-zero elements.

12. A terminal device, comprising:
a processor; and
a non-transitory computer readable storage medium storing a program for execution by the processor, the program including instructions to:
receive a first signal from a network device, wherein the first signal is generated by the network device by performing amplitude and phase adjustment, using a first signature sequence, on a modulation symbol obtained after performing constellation mapping on a first downlink data stream using a first modulation constellation;

receive indication information in a second signal transmitted by the network device separately from the first signal, wherein the indication information indicates the first signature sequence and the first modulation constellation, wherein the indication information indicates one or more second signature sequences and one or more second modulation constellations for transmitting a second downlink data stream by the network device, wherein the second downlink data stream is one or more downlink data streams, other than the first downlink data stream, that are carried on a time-frequency resource used by the first downlink data stream, and wherein the first signature sequence and the one or more second signature sequences are multi-dimensional complex-number vectors comprising at least one zero element and at least one non-zero element;

determine the first signature sequence, the first modulation constellation, the one or more second signature sequences, and the one or more second modulation constellations according to the indication information; and decode, according to the first signature sequence, the first modulation constellation, the one or more second signature sequences, and the one or more second modulation constellations.

13. The terminal device according to claim 12, wherein the indication information comprises first signature matrix information, first signature sequence information, and first indication information, wherein the first signature matrix information indicates a first signature matrix, wherein the first signature sequence information indicates the first signature sequence in the first signature matrix, wherein the first indication information indicates the first modulation constellation corresponding to the first signature sequence, and wherein the first indication information further indicates the one or more second signature sequences in the first signature matrix and the one or more second modulation constellations corresponding to the one or more second signature sequences, and wherein the instructions to determine the first signature sequence, the first modulation constellation, the one or more second signature sequences, and the one or more second modulation constellations comprises instructions to:

determine, according to the first signature matrix information, the first signature sequence information, the first indication information, the first signature sequence in the first signature matrix, the first modulation constellation, the one or more second signature sequences in the first signature matrix, and the one or more second modulation constellations corresponding to the one or more second signature sequences, wherein the first signature matrix comprises two or more signature sequences.

14. The terminal device according to claim 13, wherein the first indication information comprises first modulation constellation information, second signature sequence information, and second modulation constellation information, wherein the first modulation constellation information indicates the first modulation constellation corresponding to the first signature sequence, wherein the second signature sequence information indicates the one or more second signature sequences in the first signature matrix, and wherein the second modulation constellation information indicates the one or more second modulation constellations corresponding to the one or more second signature sequences.

15. The terminal device according to claim 14, wherein the first indication information comprises modulation order information of the first modulation constellation and modulation order information of the one or more second modulation constellations.

16. The terminal device according to claim 13, wherein the first indication information comprises M groups of bit string information corresponding to signature sequences in the first signature matrix in a one-to-one manner, wherein the M groups of bit string information indicate whether a corresponding signature sequence is the first signature sequence or the one or more second signature sequences, and wherein:

the M groups of bit string information further indicate the first modulation constellation or the one or more second modulation constellations corresponding to the corresponding signature sequence, in response to a signature sequence corresponding to the M groups of bit string information being the first signature sequence or the one or more second signature sequences, wherein M is a quantity of signature sequences comprised in the first signature matrix.

17. The terminal device according to claim 12, wherein the instructions to receive the indication information comprises instructions to:

receive, from the network device, a downlink scheduling message, dedicated higher-layer control signaling, or a system broadcast message, wherein the downlink scheduling message, the dedicated higher-layer control signaling, or the system broadcast message comprise the indication information.

18. The terminal device according to claim 17, wherein the dedicated higher-layer control signaling comprises a radio resource control (RRC) connection setup message and an RRC connection reconfiguration message.

19. The terminal device according to claim 12, wherein the indication information is bit string information.

20. A method comprising:

determining, by a network device, a first signature sequence and a first modulation constellation for transmitting a first downlink data stream to a terminal device, ;

generating a first signal by performing amplitude and phase adjustment, using the first signature sequence, on a modulation symbol obtained after performing constellation mapping on a downlink data stream using the first modulation constellation;

determining one or more second signature sequences and one or more second modulation constellations for transmitting a second downlink data stream, wherein the second downlink data stream is one or more downlink data streams other than the first downlink data stream, that are carried on a time-frequency resource used by the first downlink data stream, wherein the first signature sequence and the one or more second signature sequence are multi-dimensional complex-number vectors comprising at least one zero element and at least one non-zero element;

determining indication information indicating the first signature sequence, the first modulation constellation, the one or more second signature sequences, and the one or more second modulation constellations;

transmitting, by the network device to the terminal device, the indication information in a second signal separate from the first signal; and transmitting the first signal to the terminal device, wherein transmitting the first signal and the second signal to the terminal device causes the terminal device to determine the first signature sequence, the first modulation constellation, the one or more second signature sequences, and the one or more second modulation constellations from the received second signal and to decode the first signal according to the according to the first signature sequence, the first modulation constellation, the one or more second signature sequences, and the one or more second modulation constellations.

* * * * *